United States Patent
Lynch et al.

(10) Patent No.: US 8,478,989 B2
(45) Date of Patent: *Jul. 2, 2013

(54) METHOD AND APPARATUS TO AUTHENTICATE AND AUTHORIZE USER ACCESS TO A SYSTEM

(75) Inventors: Liam S. Lynch, San Jose, CA (US); Shashi Seth, Foster City, CA (US)

(73) Assignee: eBay Inc., San Jose, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 12/848,840

(22) Filed: Aug. 2, 2010

(65) Prior Publication Data
US 2010/0299734 A1 Nov. 25, 2010

Related U.S. Application Data

(63) Continuation of application No. 10/876,866, filed on Jun. 25, 2004, now Pat. No. 7,769,998.

(60) Provisional application No. 60/482,963, filed on Jun. 26, 2003, provisional application No. 60/482,971, filed on Jun. 26, 2003.

(51) Int. Cl.
*H04L 9/00* (2006.01)

(52) U.S. Cl.
USPC ............... 713/155; 713/159; 713/170; 726/2; 726/20

(58) Field of Classification Search
USPC ................... 726/2, 3, 6, 9, 20; 713/155, 159, 713/161, 168–170, 172; 709/224, 229
See application file for complete search history.

(56) References Cited

U.S. PATENT DOCUMENTS

| | | | |
|---|---|---|---|
| 7,225,462 B2 * | 5/2007 | Bass et al. | 726/6 |
| 7,240,192 B1 * | 7/2007 | Paya et al. | 713/152 |
| 7,769,998 B2 | 8/2010 | Lynch et al. | |
| 7,793,342 B1 * | 9/2010 | Ebrahimi et al. | 726/8 |
| 2004/0049673 A1 * | 3/2004 | Song et al. | 713/150 |
| 2004/0168083 A1 | 8/2004 | Gasparini et al. | |
| 2004/0210527 A1 | 10/2004 | Woda et al. | |
| 2005/0144452 A1 | 6/2005 | Lynch et al. | |

FOREIGN PATENT DOCUMENTS

| WO | WO-2005003907 A2 | 1/2005 |
|---|---|---|
| WO | WO-2005003907 A3 | 1/2005 |

OTHER PUBLICATIONS

U.S. Appl. No. 10/876,866, Response filed Jun. 8, 2009 to Final Office Action mailed Mar. 6, 2009, 13 pgs.
U.S. Appl. No. 10/876,866, Final Office Action mailed Mar. 6, 2009, 11 pgs.

(Continued)

*Primary Examiner* — Edward Zee
*Assistant Examiner* — Baotran N To
(74) *Attorney, Agent, or Firm* — Schwegman, Lundberg & Woessner, P.A.

(57) ABSTRACT

A method, apparatus, and system are provided for authenticating a user. According to one embodiment, a request for authentication of a user is received via a secondary site, the request for authentication of the user including user information corresponding to the user. The user information is verified and, based on the verifying, a token associated with the user is generated, the token to be used to enable the secondary site to perform a task on the primary site on behalf of the user. The token is then transmitted to the secondary site.

18 Claims, 15 Drawing Sheets

OTHER PUBLICATIONS

U.S. Appl. No. 10/876,866, Non Final Office Action mailed Aug. 25, 2009, 13 pgs.

U.S. Appl. No. 10/876,866, Non-Final Office Action mailed Jan. 10, 2008, 12 pgs.

U.S. Appl. No. 10/876,866, Non-Final Office Action mailed Jul. 18, 2008, 10 pgs.

U.S. Appl. No. 10/876,866, Notice of Allowance mailed Mar. 23, 2010, 7.

U.S. Appl. No. 10/876,866, Response filed Apr. 10, 2008 to Non-Final Office Action mailed Jan. 10, 2008, 15 pgs.

U.S. Appl. No. 10/876,866, Response filed Oct. 12, 2007 to Restriction Requirement mailed Sep. 18, 2007, 10 pgs.

U.S. Appl. No. 10/876,866, Response filed Nov. 25, 2009 to Non Final Office Action mailed Aug. 25, 2009, 14 pgs.

U.S. Appl. No. 10/876,866, Response filed Dec. 2, 2008 to Non-Final Office Action mailed Jul. 18, 2008, 15 pgs.

U.S. Appl. No. 10/876,866, Restriction Requirement mailed Sep. 18, 2007, 6 pgs.

* cited by examiner

METHOD AND APPARATUS TO AUTHENTICATE AND AUTHORIZE USER ACCESS TO A SYSTEM

RELATED APPLICATIONS

This application is a continuation of U.S. application Ser. No. 10/876,866 (issuing as U.S. Pat. No. 7,769,998 on Aug. 3, 2010), filed on Jun. 25, 2004, which claims the priority benefits of U.S. Provisional Application No. 60/482,963 and 60/482,971, filed Jun. 26, 2003, which are incorporated herein by reference.

BACKGROUND OF THE INVENTION

1. Field of the Invention

Exemplary embodiments of the present invention relate generally to the technical field of commerce automation and, in one exemplary embodiment, to methods and systems to authenticate and authorize user access to a system.

2. Description of Related Art

The Internet and the World Wide Web ("Web") have changed the landscape of information delivery and affected numerous faculties of life, including electronic commerce and entertainment. One area that has benefited from this technological development is the ability for individuals to buy and sell products over the Internet. The growing electronic commerce has encouraged many businesses to join hands in doing business and in sharing customers and their information. The overlapping businesses, partnerships in conducting business, referrals, mutual distribution of resources, and sharing of users and user information has created a network of applications, servers, and Websites which has created various technical challenges, complexities, and insecurities.

A number of technical challenges exist with respect to authorization and authentication of users and/or systems. For example, conventionally, when a user accesses the primary system via a secondary system, much of sensitive and personal user information, ranging from passwords to profiles, is directly transmitted between the primary and secondary systems. Such transmission of data is not only inherently insecure, but also it is cumbersome, at least, in that it requires a separate transmission for each of the secondary systems that the user accesses, even if it is to ultimately access the same primary system. Furthermore, this and other technological challenges also limit the performance of system network between primary and secondary systems, in general, and the ability of the user to access multiple systems, in particular.

SUMMARY

A method, apparatus, and system are provided for authenticating a user. According to one embodiment, a request for authentication of a user is received from a secondary site. The request includes information relating to the user. The user information is then verified for authenticity. If the user information is verified, a token, associated with the user, is generated at the primary site and transmitted from the primary site to the secondary site on behalf of the user to permit the user to access the primary site via the secondary site, via the computer network.

BRIEF DESCRIPTION OF THE DRAWINGS

The appended claims set forth the embodiments of the present invention with particularity. The embodiments of the present invention, together with its advantages, may be best understood from the following detailed description taken in conjunction with the accompanying drawings of which:

DETAILED DESCRIPTION

Figure 1:
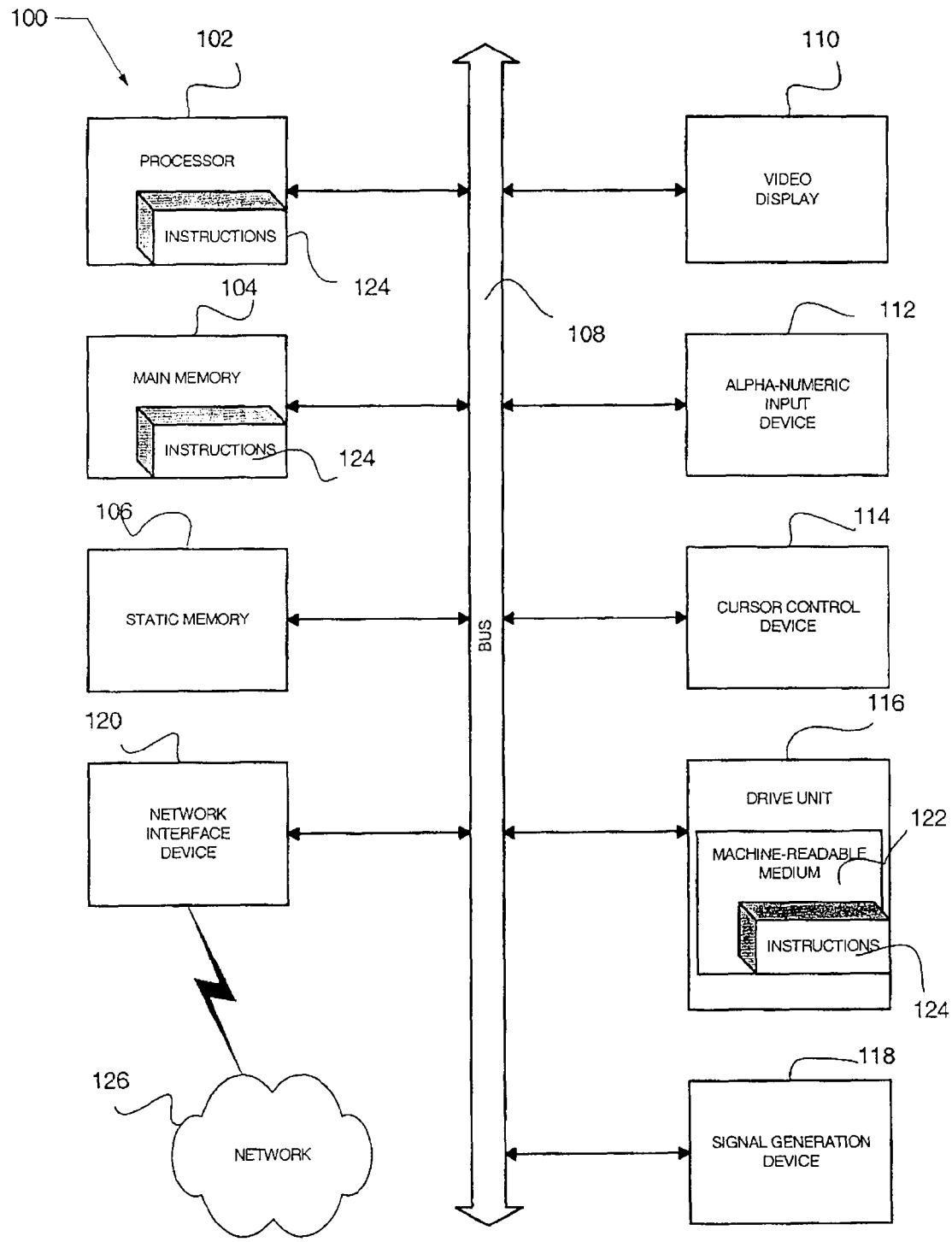
FIG. 1 is a block diagram illustrating an embodiment of a computer system.

Described below is a system and method for authenticating and authorizing user access to a system. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 is a block diagram illustrating an embodiment of a computer system (system) 100. As illustrated, the system 100 includes an exemplary machine within which a set of instructions, for causing the machine to perform any one or more of the methodologies discussed herein, may be executed. The system 100 may operate as a standalone device or may be connected (e.g., networked) to other machines or systems. In a networked deployment, the system 100 could operate in the capacity of a server or a client machine in server-client network environment, or as a peer machine in a peer-to-peer (or distributed) network environment. The system 100 may include a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single system 100 is illustrated, the term "machine" or "system" shall also be taken to include any collection of systems or machines that individually or jointly execute a set (or multiple sets) of instructions to perform any one or more of the methodologies discussed herein.

The system 100 includes a processor 102 (e.g., a central processing unit (CPU), a graphics processing unit (GPU), or both), a main memory (memory) 104 and a static memory 106, which communicate with each other via a bus 108. The system 100 further includes a video display unit 110 (e.g., a liquid crystal display (LCD) or a cathode ray tube (CRT)). The system 100 also includes an alphanumeric input device 112 (e.g., a keyboard), a cursor control device 114 (e.g., a mouse), a disk drive unit 116, a signal generation device 118 (e.g., a speaker) and a network interface device 120 to connect the system 100 with other systems or machines via a network (e.g., the Internet) 126.

The processor 102 may include multiple processors including one or more multi-threaded processors having multiple threads or logical processors, and may be capable of processing multiple instruction sequences concurrently using its multiple threads. The processor 102 further includes one or more microprocessors, microcontrollers, field programmable gate arrays (FPGA), application specific integrated circuits (ASIC), central processing units (CPU), programmable logic devices (PLD), and similar devices that access instructions from system storage (e.g., main memory 104), decode them, and execute those instructions by performing arithmetic and logical operations. The processor 102 may also include one or more internal caches (not shown).

The bus 108 is known as the host bus or the front side bus, and may be used to couple the processors 102 with the system interface. The bus 108 may also be coupled with a control bus, an address bus, and/or a data bus (not shown). The control bus, the address bus, and the data bus may be multidrop bi-directional buses, e.g., connected to three or more bus agents, as opposed to a point-to-point bus, which may be connected only between two bus agents.

The memory 104 may include a dynamic storage device, a random access memory (RAM), or other storage device coupled with the bus 108 for storing information and instructions 124 to be executed by the processor 102. The memory 104 is also used for storing temporary variables or other intermediate information during execution of instructions 124 by the processors 102. The static memory 106 may include a read only memory (ROM) and/or other static storage device coupled with the processor 102 via the bus 108 for storing static information and instructions for the processor 102.

The memory 104 includes a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. The memory 104 may also include one or more hard disks, floppy disks, ZIP disks, compact disks (e.g., CD-ROM), digital versatile/video disks (DVD), magnetic random access memory (MRAM) devices, and other system-readable media that store instructions and/or data. The memory 104 is used to store program modules, such as routines, programs, objects, images, data structures, program data, and other program modules that perform particular tasks or implement particular abstract data types that facilitate system use.

The network interface device 120 may include a modem, a network interface card, or other well-known interface devices, such as those used for coupling with Ethernet, token ring, or other types of physical attachment for purposes of providing a communication link to support a local or wide area network 126, for example. Stated differently, the system 100 may be coupled with a number of clients and/or servers via a conventional network infrastructure 126, such as a company's Intranet and/or the Internet, for example.

The disk drive unit 116 may include a machine-readable medium 122 on which may be stored one or more sets of instructions (e.g., software 124) embodying any one or more of the methodologies or functions described herein. The software 124 may also reside, completely or at least partially, within the memory 104 and/or within the processor 102 during execution thereof by the computer system 100, the memory 104 and the processor 102 also constituting machine-readable media. The software 124 may further be transmitted or received over a network 126 via the network interface device 120.

While the machine-readable medium 122 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 100 and that causes the machine to perform any one or more of the methodologies of the present invention. The term "machine-readable medium" shall accordingly be taken to include, but not be limited to, solid-state memories, optical and magnetic media, and carrier wave signals.

Furthermore, it is appreciated that a lesser or more equipped computer system than the example described above may be desirable for certain implementations. Therefore, the configuration of system 100 may vary from implementation to implementation depending upon numerous factors, such as price constraints, performance requirements, technological improvements, and/or other circumstances.

It should be noted that, while the embodiments described herein may be performed under the control of a programmed processor, such as the processor 102, in alternative embodiments, the embodiments may be fully or partially implemented by any programmable or hardcoded logic, such as field programmable gate arrays (FPGAs), Transistor Transistor Logic (TTL), and application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 2:
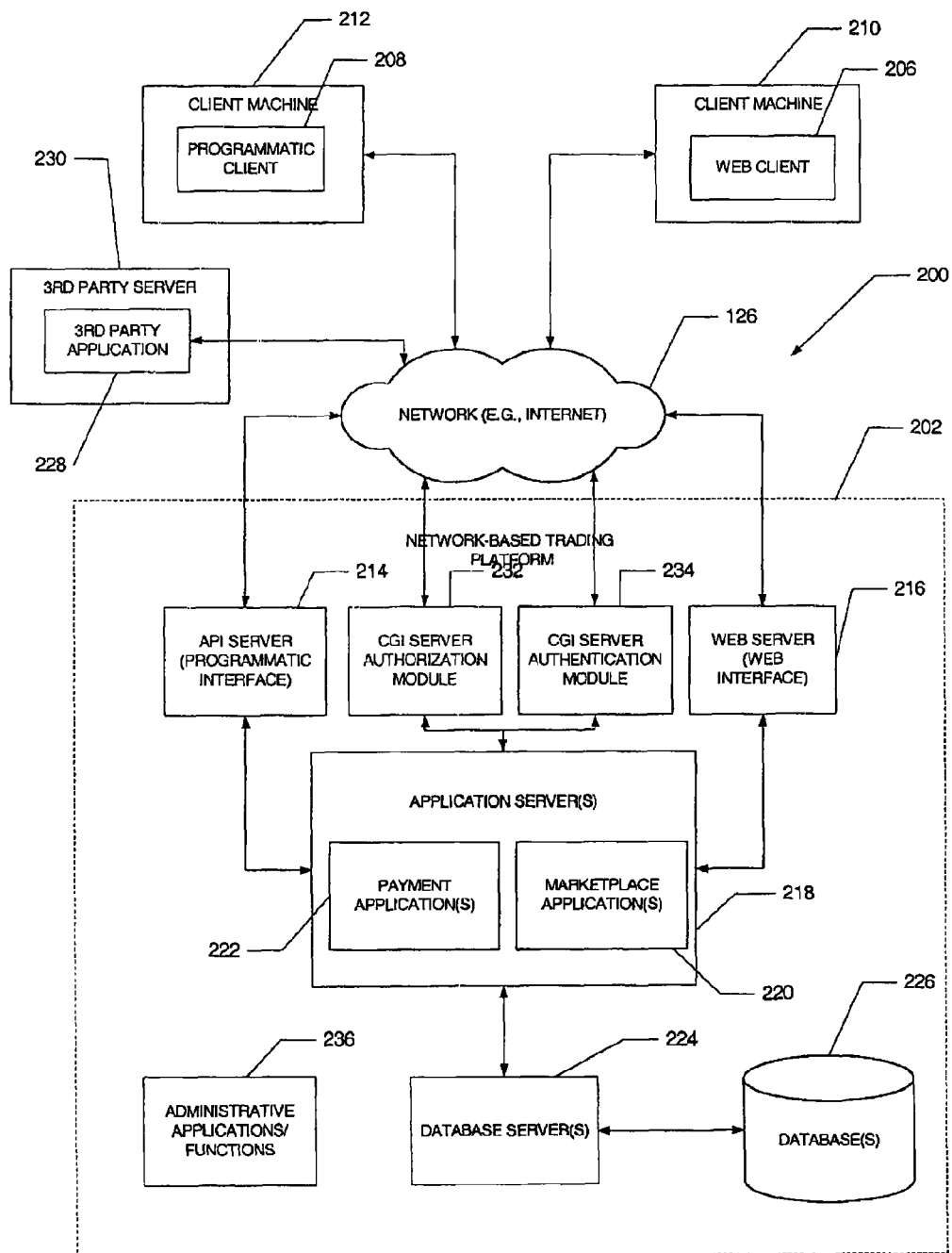
FIG. 2 is a block diagram illustrating an embodiment of a network.

FIG. 2 is a block diagram illustrating an embodiment of a network 200. As illustrated, the network (or architecture) 200 includes a commerce platform, such as a network-based marketplace or trading platform 202, to provide server-side functionality, via a network 126 (e.g., the Internet) to one or more clients, such as client machines 210-212. As illustrated, for example, a web client 206 (e.g., a browser, such as the Internet Explorer or the Netscape Navigator), and a programmatic client 208 may execute on their respective client machines 210 and 212.

Turning specifically to the network-based marketplace 202, an application program interface (API) server 214 and a web server 216 may be coupled to, and provide programmatic and web interfaces respectively to, one or more application servers 218. The application servers 218 may host one or more marketplace applications 220 and payment applications 222. Furthermore, the application servers 218 are coupled to one or more databases servers 224 to facilitate access to one or more databases 226.

The marketplace applications 220 provide a number of marketplace functions and services to users that access the marketplace 202. The payment applications 222, likewise, may provide a number of payment services and functions to users. The payment applications 222 may allow users to quantify for, and accumulate, value (e.g., in a commercial currency, such as the U.S. dollar, or a proprietary currency, such as "points") in accounts, and then to redeem the accumulated value for products (e.g., goods or services) that are made available via the marketplace applications 220. While the marketplace and payment applications 220 and 222, as illustrated, both form part of the network-based marketplace 202, it will be appreciated that, in alternative embodiments of the present invention, the payment applications 222 may form part of a payment service that is separate and distinct from the marketplace 202.

Further, while the network 200, as illustrated, may employ a client-server architecture, embodiments of the present invention are not limited to it, and may equally find applications in a distributed, or peer-to-peer, architectures. The various marketplace and payment applications 220 and 222 may also be implemented as standalone software programs, which do not necessarily have networking capabilities.

The web client 206, it will be appreciated, may access the various marketplace and payment applications 220 and 222 via the web interface supported by the web server 216. Similarly, the programmatic client 208 may access the various services and functions provided by the marketplace and payment applications 220 and 222 via the programmatic interface provided by the API server 214. The programmatic client 208 may, for example, be a seller application (e.g., the TurboLister application developed by eBay Inc., of San Jose, Calif.) to enable sellers to author and manage listings on the marketplace 202 in an off-line manner, and to perform batch-mode communications between the programmatic client 208 and the network-based marketplace 202.

The architecture 200 further includes Common Gateway Interface (CGI) servers associated with the authorization module 232 and the authentication module 234. The authorization module 232 is to perform authorization-related functions for authorizing users accessing a primary system (e.g., a platform-related Website, application, platform, device, tool, and site) from a secondary system (e.g., Website, application, platform, device, tool, and site). The authorization module 232 is also for facilitating the user to authorize the secondary system to access the primary system and act or perform on behalf of the user. The authentication module 234 is to perform authentication-related functions for authenticating users, prior to authorizing them, to access the primary system via the secondary system. Administrative applications/functions 236 of the architecture 200 are utilized to help perform some of the authorization and authentication functions as necessitated or desired.

Figure 3:
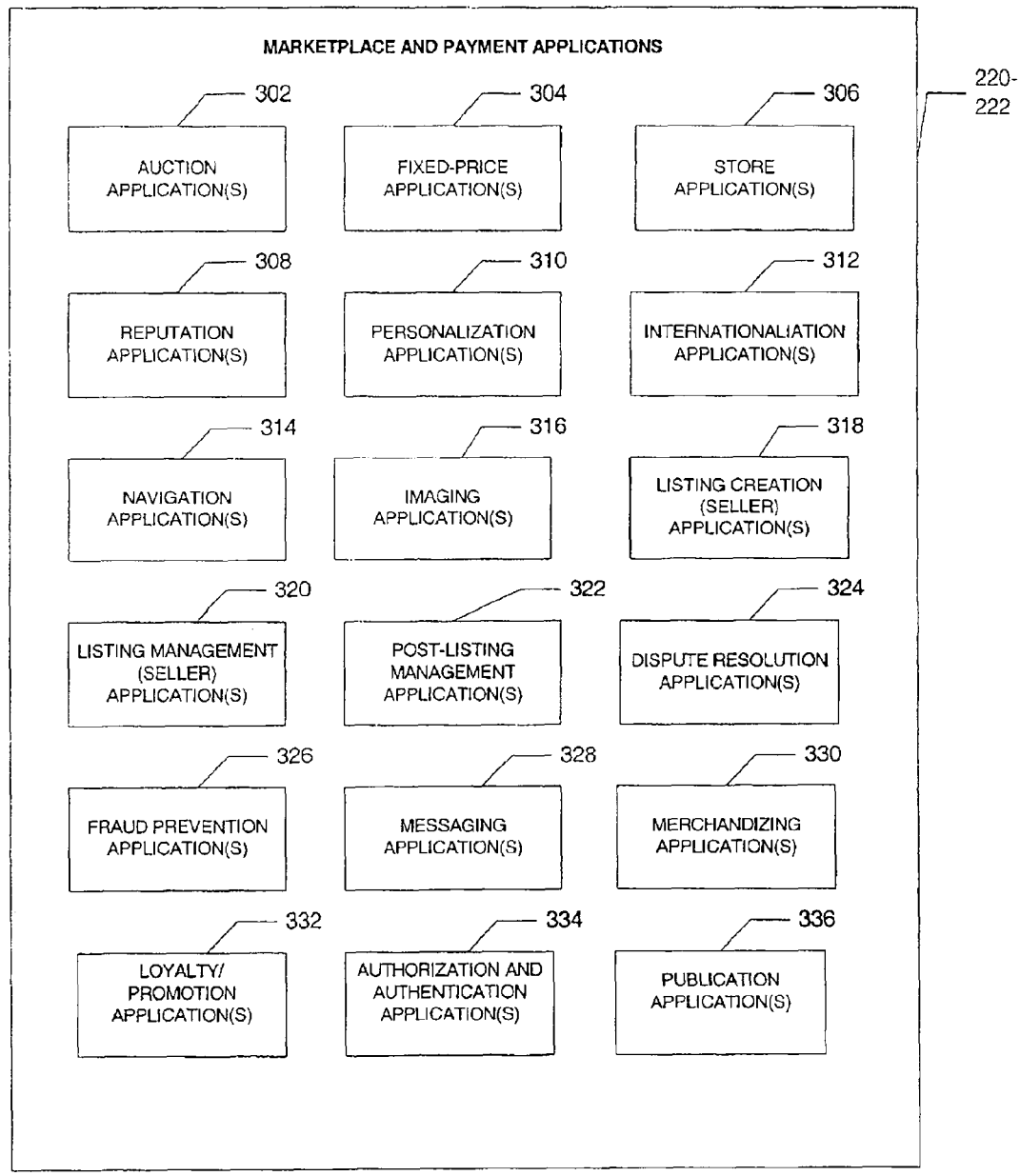
FIG. 3 is a block diagram illustrating an embodiment of marketplace and payment applications.

FIG. 3 is a block diagram illustrating an embodiment of marketplace and payment applications 220-222. Multiple marketplace and payment applications 220-222 are provided as part of the network-based marketplace or trading platform 202, as illustrated and described with respect to FIG. 2. The network-based marketplace 202 may provide a number of listing and price-setting mechanisms whereby a seller may list goods or services for sale, a buyer may express interest in or indicate a desire to purchase such goods or services, and a price may be set for a transaction pertaining to the goods or services. To this end, the marketplace applications 220 may include one or more auction applications 302 to support auction-format listing and price setting mechanisms (e.g., English, Dutch, Vickrey, Chinese, Double, Ascending, Reverse and Declining auctions etc.). The various auction applications 302 also provide a number of features in support of such auction-format listings, such as a reserve price feature whereby a seller may specify a reserve price in connection with a listing and a proxy-bidding feature whereby a bidder may invoke automated proxy bidding.

One or more fixed-price applications 304 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format (or other dynamic pricing format) listing, and allow a buyer to purchase goods or services, which are also being offered for sale via an auction, for a fixed-price that is typically higher than the starting price of the auction.

In one embodiment, one or more authorization and authentication applications 334 are provided to help support the authorization and authentication mechanism to authenticate and authorize users and various systems, applications, and tools. The authorization and authentication applications 334 also perform certain administrative functions to ensure credibility, security, reliability, scalability, and availability of the system, as a whole, and the process of authorization and authentication.

One or more publishing applications 336 are used to publish the information relating to auctions, such as the declining price auction. For example, in an embodiment where the financial instruments are offered for sale over the Internet, the publishing applications 336 may format information about the financial instruments in a web page and provide that web page over the Internet to potential buyers. The publishing applications 336 may also update the current offer price (e.g., $100) or interest rate (e.g., 10%), as necessary, when the current offer price or interest rate is changed using the auction applications 302.

The store applications 306 allow sellers to group their listings within a "virtual" store (e.g., a virtual bank), which are branded and otherwise personalized by and for the sellers. Such a virtual store also offers promotions, incentives and features that are specific and personalized to a relevant seller.

The reputation applications 308 allow parties that transact utilizing the network-based marketplace 202 to establish, build, and maintain reputations, which are made available and published to potential trading partners. Consider that where, for example, the network-based marketplace 202 may support a person-to-person trading, users may have no history or other reference information whereby the trustworthiness and credibility of potential trading partners may be assessed. The reputation applications 308 may allow a user, for example through feedback provided by other transaction partners, to establish a reputation within the network-based marketplace 202 over time. Other potential trading partners may then reference such a reputation for the purposes of assessing credibility and trustworthiness.

The personalization applications 310 allow users of the marketplace 202 to personalize various aspects of their interactions with the marketplace 202. For example a user may, utilizing an appropriate personalization application 310, create a personalized reference page at which information regarding transactions to which the user is (or has been) a party may be viewed. Further, the personalization applications 310 may enable a user to personalize listings and other aspects of their interactions with the marketplace 202 and other parties.

The network-based marketplace 202 supports a number of marketplaces that are customized, for example, for specific geographic regions. For example, a version of the marketplace 202 may be customized for the United Kingdom, whereas another version of the marketplace 202 may be customized for the United States of America. Each of these versions may operate as an independent marketplace, or may be customized (or internationalized) presentations of a common underlying marketplace.

The navigation of the network based-marketplace 202 is facilitated by one or more navigation applications 314. For example, a search application may enable key word searches of listings published via the marketplace 202. A browse application may allow users to browse various categories, catalogues, or inventory data structures according to which listings may be classified within the network-based marketplace 202. Various other navigation applications 314 may be provided to supplement the search and browsing applications.

In order to make listings, available via the network-based marketplace 202, as visually informing and attractive as possible, the marketplace applications 220 may include, according to one embodiment, one or more imaging applications 316 utilizing which users may upload images for inclusion within listings. The imaging applications 316 also operate to incorporate images within viewed listings. The imaging applications 316 may also support one or more promotional features, such as image galleries that are presented to potential buyers. For example, sellers may pay an additional fee to have an image included within a gallery of images for promoted items.

The listing creation applications 318 allow sellers conveniently to author listings pertaining to goods or services that they wish to transact via the network-based marketplace 202, and listing management applications 320 may allow sellers to manage such listings. Specifically, where a particular seller has authored and/or published a large number of listings, the management of such listings may present a challenge. The listing management applications 320 provide a number of features (e.g., auto-relisting, inventory level monitors, etc.) to assist the seller in managing such listings. One or more post-listing management applications 322 may also assist sellers with a number of activities that typically occur post-listing. For example, upon completion of an auction facilitated by one or more auction applications 302, a seller may wish to leave feedback regarding a particular buyer. To this end, a post-listing management application 322 may provide an interface to one or more reputation applications 308, so as to allow the seller conveniently to provide feedback regarding multiple buyers to the reputation applications 308. Goods and services may also include financial instruments, such as CDs, notes, credit cards, bank accounts, mortgages, bonds, etc.

The dispute resolution applications 324 provide mechanisms whereby disputes arising between transacting parties may be resolved. For example, the dispute resolution applications 324 may provide guided procedures whereby the parties are guided through a number of procedures in an attempt to settle a dispute. In the event that the dispute cannot be settled via the guided procedures, according to one embodiment, the dispute may be escalated to a third party mediator or arbitrator.

A number of fraud prevention applications 326 implement various fraud detection and prevention mechanisms to reduce the occurrence of fraud within the network-based marketplace 202. The messaging applications 328 are responsible for the generation and delivery of messages to users of the network-based marketplace 202. Such messages, for example, may advise users regarding the status of listings at the network-based marketplace 202 (e.g., providing "outbid" notices to bidders during an auction process or to provide promotional and merchandising information to users).

The merchandising applications 330 support various merchandising functions that are made available to sellers to enable sellers to increase sales via the network-based marketplace 202. The merchandising applications 330 may also operate the various merchandising features that may be invoked by sellers, and may monitor and track the success of merchandising strategies employed by sellers.

The network-based marketplace 202 itself, or one or more parties that transact via the network-based marketplace 202 operate loyalty programs that are supported by one or more loyalty/promotions applications 332. For example, a buyer may earn loyalty or promotions points for each transaction established and/or concluded with a particular seller, and may be offered a reward for which accumulated loyalty points can be redeemed.

Figure 4:
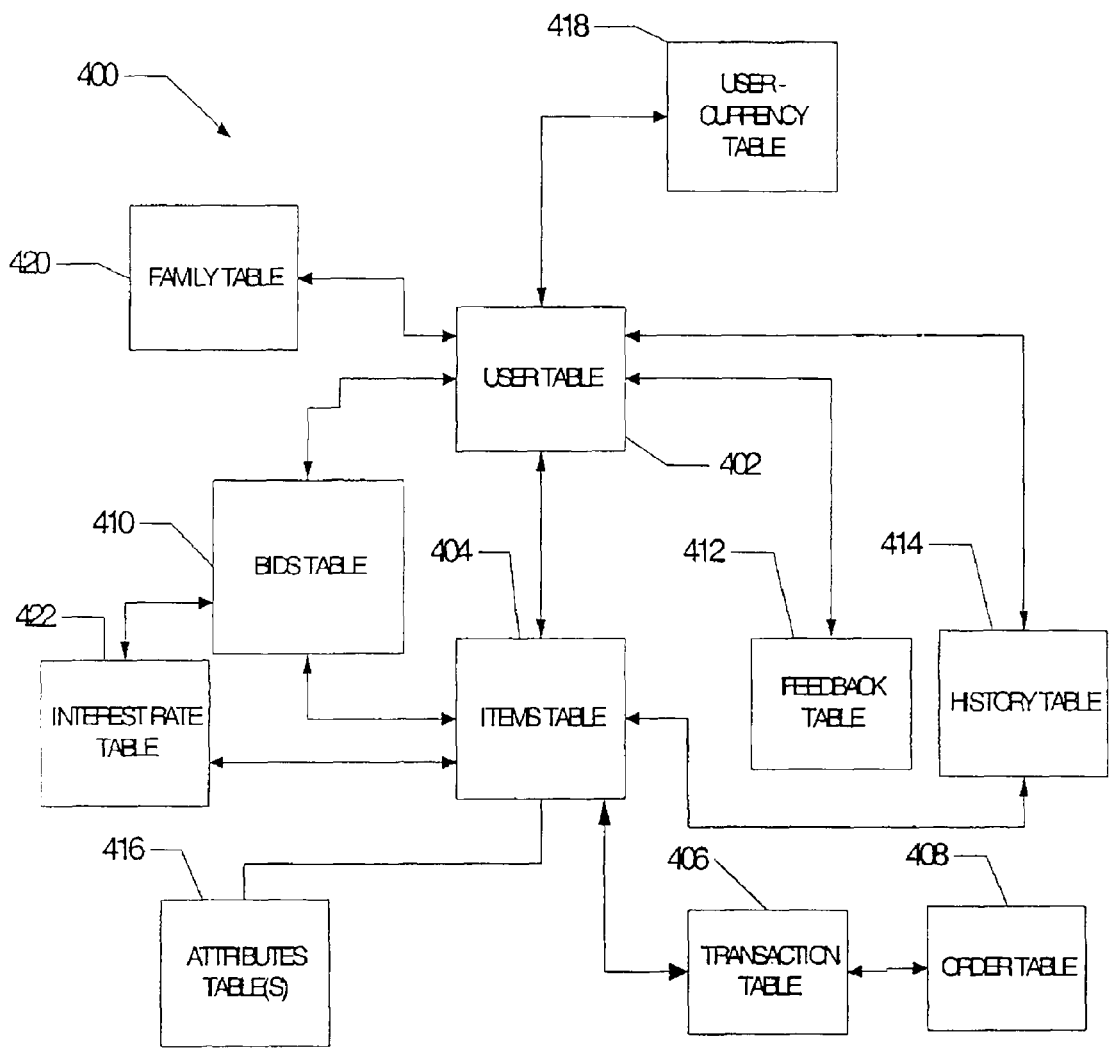
FIG. 4 is a block diagram illustrating an embodiment of a high-level entity-relationship.

FIG. 4 is a block diagram illustrating an embodiment of a high-level entity-relationship. As illustrated, various tables 400 are maintained within the databases 226 (FIG. 2), and utilized by and support the marketplace and payment applications 220 and 222 (FIGS. 2 and 3). A user table 402 contains a record for each registered user of the network-based marketplace 202 and includes identifier, address, and financial instrument information pertaining to each such registered user. It is contemplated that a user can operate as a seller, a buyer, or both, within the network-based marketplace 202. Also, a buyer may be a user that has accumulated value (e.g., commercial or proprietary currency or interest rate) and is then able to exchange the accumulated value for items (e.g., goods, services, and financial instruments) that are offered for sale by the network-based marketplace 202.

The tables 400 also include an items table 404 which is used to maintain item records for the items that are available to be, or have been, transacted via the network-based marketplace 202. Each item record within the items table 404 is also linked to one or more user records within the user table 402, so as to associate a seller and one or more actual or potential buyers with each item record.

A transaction table 406 contains a record for each transaction (e.g., a purchase transaction) pertaining to items for which records may exist within the items table 404. An order table 408 may be populated with order records, each order record may be associated with an order. Each order, in turn, is with respect to one or more transactions for which records may exist within the transactions table 406.

The bid records maintained within a bids table 410 relate to bids received at the network-based marketplace 202 in connection with auction-format listings supported by the auction application 302. An interest rate table 422 contains information relating to interest rates at they relate to the items (e.g., financial instruments) on sale. For example, the interest rate table 422 includes the start offer interest rate, increments at which the interest rate may be declined, and the reserve interest rate (e.g. maximum and minimum interest rates) corresponding to each of the items. The interest rate table 422 includes overlapping information from other tables, such as the bids table 410, items table 404, and history table 414. A history table 414 may maintain a history of transactions to which a user has been a party.

Attributes tables 416 record attribute information pertaining to items for which records may exist within the items table 404. A feedback table 412 may be utilized by one or more reputation applications 308 to construct and maintain reputation information concerning users. Considering only a single example of such an attribute, the attributes tables 416 may indicate a currency or interest rate attribute associated with a particular item, identifying the currency or interest rate for the relevant item as specified by a seller. The tables 400 illustrated here, and the like, are included in the databases 226 and/or may be, directly or indirectly, coupled with each other. Furthermore, not all tables 400 are needed and conversely, additional tables, not illustrated here, are added, as necessitated.

Figure 5:
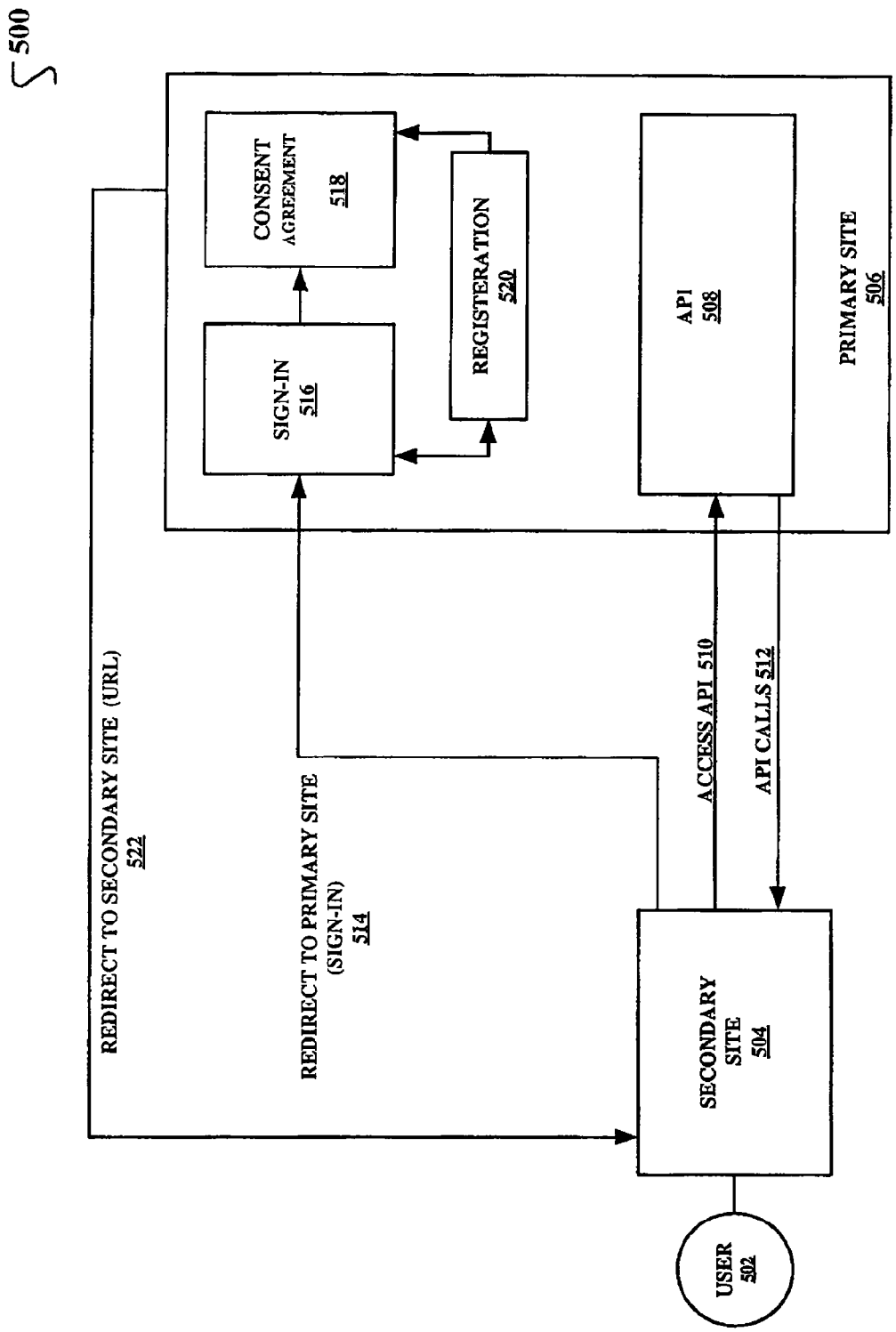
FIG. 5 is a block diagram illustrating an embodiment of an authentication and authorization mechanism.

FIG. 5 is a block diagram illustrating an embodiment of an authentication and authorization mechanism (mechanism) 500. In one embodiment, the mechanism 500 is used to authenticate and authorize the user 502 seeking to access a primary site (e.g., branded platform-related applications, Websites, tools, systems, networks, and sites, such as eBay.com, eBay toolbar, and eBay Rewards) 506 via a secondary site (e.g., partner applications, Websites, tools, systems, networks, and sites, such as Microsoft Network (MSN), America Online (AOL), PayPal, Amazon.com, AuctionWatch, Andale, eWatch, eBay Rewards, eBay Toolbar, and community boards) 504. The secondary site 504 may be a business partner, associate, or subsidiary of the primary site 506. The mechanism 500 is also used to allow the user 502 to authorize the secondary site 504 to access the primary site 506 and perform various tasks (e.g., placing bids, introducing items for bidding) on behalf of the user 502.

In the illustrated embodiment, the user 502 uses the secondary site 504 to access the primary site 506 to perform various tasks (e.g., participate in commerce-related activity) on the primary site 506. When the user 502 attempts to access the primary site 506, via the secondary site 504, the secondary site 504 determines whether there is a token (e.g., partial token, half token, split token) at the secondary site 504 that corresponds to the user 502. If the token is found, the Application Program Interface (API) 508 at the platform at the primary site 506 is accessed 510, which is verified by receiving back the API calls (e.g., certificate via Certificate Authority) 512, on behalf of the user 502. The user 502 may then access the primary site 506 via the secondary site 504. The existence of the token refers to the user having the authentication and the authorization from the primary site 506.

If the token associated with the user 502 is not found at the secondary site 504, the user is redirected 514 to the primary site 506 for sign-in 516 and/or registration 520. Stated differently, if the user 502 has not signed-in 516 or registered 520 with the primary site 506, the secondary site 504 may not recognize the user 502 as authentic or authorized to access the primary site 506, as there has not yet been a token generated by the primary site 506 and placed at the secondary site 504 for the user 502. The user 502, if already registered, may choose to sign-in 516 (e.g., at http://www.signin.website.com), provide consent by signing the consent agreement 518, and get redirected 522 to the secondary site 504. If not yet registered, the user 502 may choose to first register 520, and then sign-in 516, sign the consent agreement 518, and get redirected 522 to the secondary site 504. In addition to the user 502 being authenticated and authorized, the secondary site 504 may also be authorized by the user 502, using a preference page at the transaction platform of the primary site 506, to allow the secondary site 504 to access the primary site 506 on behalf of the user 502. The user 502 may also choose to authorize the secondary site 504 to perform various tasks on the primary site 506 on behalf of the user 502.

The secondary site 504 may be provided with a certificate from an authenticator (e.g., Credential Authority) residing at the transaction platform of the primary site 506. The certificate may include a standard certificate used by developers as part of the API call 512. The certificate may also be used to identify the secondary site 504 to the transaction platform at the primary site 506 and be distinctly different than the standard certificate. The secondary site 504 may also be configured into the transaction platform authorization infrastructure of the primary site 506 and assigned an internal authorization level. The authorization level helps grade and distinguish various secondary sites 504 according to types of APIs 508 provided, rights granted by the transaction platform, the community of users at the primary site 506, and the types of integration tokens provided by the primary site 506 and used to configure the secondary sites 504. This may be accomplished through an API 508 and can be automated by utilizing a set of internal transaction platform tools. Furthermore, the transaction platform at the primary site 506 may also include any number of platform tools and protocols (e.g., standard API model, Simple Object Access Protocol (SOAP), certificates, Security Assertion Markup Language (SANL)) and the type and combination of which may depend on the type of configuration of the secondary site 504.

In case of a user 502 not signing-in 516 or registering 520, the secondary site 504 may not have a token associated with the user 502. In the absence of such a token, the secondary site 504 may redirect 514 the user 502 to the primary site 506 for sign-in 516 and/or registration 520, so the token can be generated by and obtained from the primary site 506. A token (e.g., integration token, eBay information Architecture Security (EIAS) token) may include a string of secret characters that correspond to the user 502. The token is generated by the primary site 506 for the user 502 and a segment or portion of the token (e.g., half token, partial token) is then transmitted to the secondary site 504 either when redirecting 522 the user 502 back to the secondary site 504 or when requested by the secondary site 504 at a later time. Unlike a cookie, a token is not saved on the user's machine; but instead, it may be split between the primary and secondary sites 504-506 for storage purposes. In the event the user 502 fails to sign in 516 or register 520 or does not agree to the consent agreement 518, the user is redirected 522 back to the secondary site 504 with an error message or code, indicating such failure.

In one embodiment, the token is used to confirm the identity of the user 502 and allow the secondary site 504 to use that information to construct their own registration for the user 502, who is now regarded as part of the transaction platform community. In this case, the token may be used as a one-time mechanism for authentication and authorization purposes (e.g., using HyperText Transport Protocol (HTTP) Get), as there may not be a need to re-authenticate or re-authorize the user 502. In another embodiment, the token is used on behalf of the user 502 over time (e.g., using HTTP Post). For example, the token, corresponding with the user 502, is generated by the primary site 506 and is then segmented into two operating pieces or halves. One half of the token is provided to the secondary site 504 and the other half is stored at the primary site 506 at its transaction platform. It is contemplated that a token may be divided into more than two pieces, as necessitated or desired.

A mechanism (e.g., Split Verification Environment (SVE)) may be used for dividing the token into two or more pieces. The SVE mechanism is further used to bind the authorization level of the secondary site 504 to accept a split token or a full token. The authorization level of the secondary site 504 helps an API call 512 determine whether the secondary site 504 is set to receive a split token or a full token. The SVE mechanism refers to an environment in which federated authentication occurs using a limited number of tokens to represent a user's authentication state based on various factors, such as use-case basis and the relationship between the primary site 506 and the secondary site 504. The SVE mechanism may be part of the sign-in mechanism (e.g., platform sign-in mechanism collectively referring to sign-in 516, registration 520, and consent agreement 518) that may produce an SVE authentication component to be used for the SVE mechanism.

A token may be good for a specified/predetermined time period (e.g., Time-To-Live (TTL)) period and may get refreshed after the particular time period has expired. The time period may be configurable by the transaction platform at the primary site 506, where the configuration of the token and the time period may dependent on the database activity being conducted at the transaction platform on a given day. For example, during low traffic days the time period on the token can be configured to be refreshed every 12 hours, where as on high traffic days the time period can be set to 36 hours. Stated differently, the configuration of the token and the time period assigned to it may be regarded as a trade-off between security and database traffic. Each token may be assigned a hard expiration and one or more soft expirations. At the occurrence of the hard expiration, the token is reissued by the primary site 506, if requested by the user 502 and the secondary site 504, while at the occurrence of a soft expiration, the token may be renewed (also in response to a request). Stated differently, the hard expiration of the token necessitates issuance of a new token, while the soft expiration may be removed by extending the expiration date of the token.

Furthermore, depending on the trust level of the secondary site 504 and its relationship with the primary site 506, a token may be assigned a timeout period, during which, for security reasons, an automatic verification of the information relating to the user 502 and the secondary site 504 is performed. The weaker the trust and the relationship of the secondary site 504 with the primary site 506, the more frequently such timeouts may occur. Conversely, the stronger the trust and relationship, the fewer times such timeouts may occur. A timeout may be for any amount of time necessary or desired to perform the security check.

To successfully receive and use tokens, the secondary site 504 may provide a set of information to be associated with the tokens to the primary site 506. Such information may include Uniform Resource Locator (URL), application identification (AppId), user certification, return URL name (RUName), return URL identification (RUID), and return URL parameters (RUParams), etc. For example, the redirection 522 of the user 502 may be performed by having the secondary site 504 provide its URL in a hidden field as part of the HTTP header, or the RUID may refer to the preset URL that the user 502 is directed to after completing the sign-in flow 516-518. Stated differently, the redirection 522 may be accomplished by having the secondary site 504 setting a couple of variables beforehand and passing them on to the primary site 506 when the user 502 is redirected 514 for the sign-in flow 516-518. For example, the first variable (e.g., RUName) allows the secondary site 504 to set multiple URLs and identify them by utilizing unique identifiers. The second variable (e.g., RUParams) is used to indicate to the primary site 506 to append this variable to the URL (e.g., as in state or session identifiers) before redirecting 522 the user 502 back to the secondary site 504.

Furthermore, the redirection 522 may be accomplished using a hidden jump page using HTTP Post, which further includes various expirations (e.g., hard expiration, soft expiration) of the token to allow the secondary site 504 to manage token expirations at the local level. Such information (e.g., hard/soft expirations) is communicated from the primary site 506 to the secondary site 504 via one or more API calls 512.

Once the user 502 is authenticated and authorized to access the primary site 506, via the secondary site 504, the user 502 may customize the preference settings using a preference page (e.g., Authorization Preferences) at the primary site 506 for any of the secondary sites 504 the user 502 wishes to access. For example, the user 502 may choose to add or delete a secondary site 504 by clicking on a button or checking a box on the preference page. Furthermore, depending on the preference settings, the secondary site 504 may perform various tasks on behalf of the user 502. Such tasks include: (1) selling on an auction (e.g., adding items, relisting item, selling similar items, placing personal offers); (2) update listing (e.g., adding to item description, revising items); (3) placing offers (e.g., bidding, purchasing); (4) acquiring and providing user information (e.g., getting account information, update shipping address, selling inventory, getting seller transactions, getting seller events, getting seller lists, getting items, revising checkout status, buying inventory, getting watched items, getting bidder lists); (5) managing auctions; and (6) performing other/miscellaneous tasks. The user 502 may set a timeframe (e.g., full time (default), Mondays and Wednesdays, 10 AM-5 PM Monday-Thursday, June 1-August 31) in which the secondary site 504 is allowed to perform such tasks on behalf of the user 502 in the absence and/or presence of the user 502.

When communicating with the primary site 506 on behalf of the user 502, the secondary site 504 may transmit (a portion or segment of) the token to the primary site 506 as part of the eXtensible Markup Language (XML) schema when accessing the API 510. This informs the primary site 506 that the secondary site 504 is making a request on behalf of the user 502, and upon receiving of the portion of the token, the primary site 506 verifies the token by matching it with the other portion of the token that it owns. If the two portions of the token are matched, the user 502 is permitted to access the primary site 506. Furthermore, the secondary site 504 is permitted to access the primary site 506 and, depending on the preference settings, the secondary site 504 is permitted to act on behalf of the user 502. When accessing multiple secondary sites 504, a separate token, associated with the user 502, is generated at the primary site 506 and transmitted from the primary site 506 to each of secondary sites 504. In this case, each secondary site 504 receives a token (or a portion of the token) that is distinct from the token at another secondary site.

Figure 6:
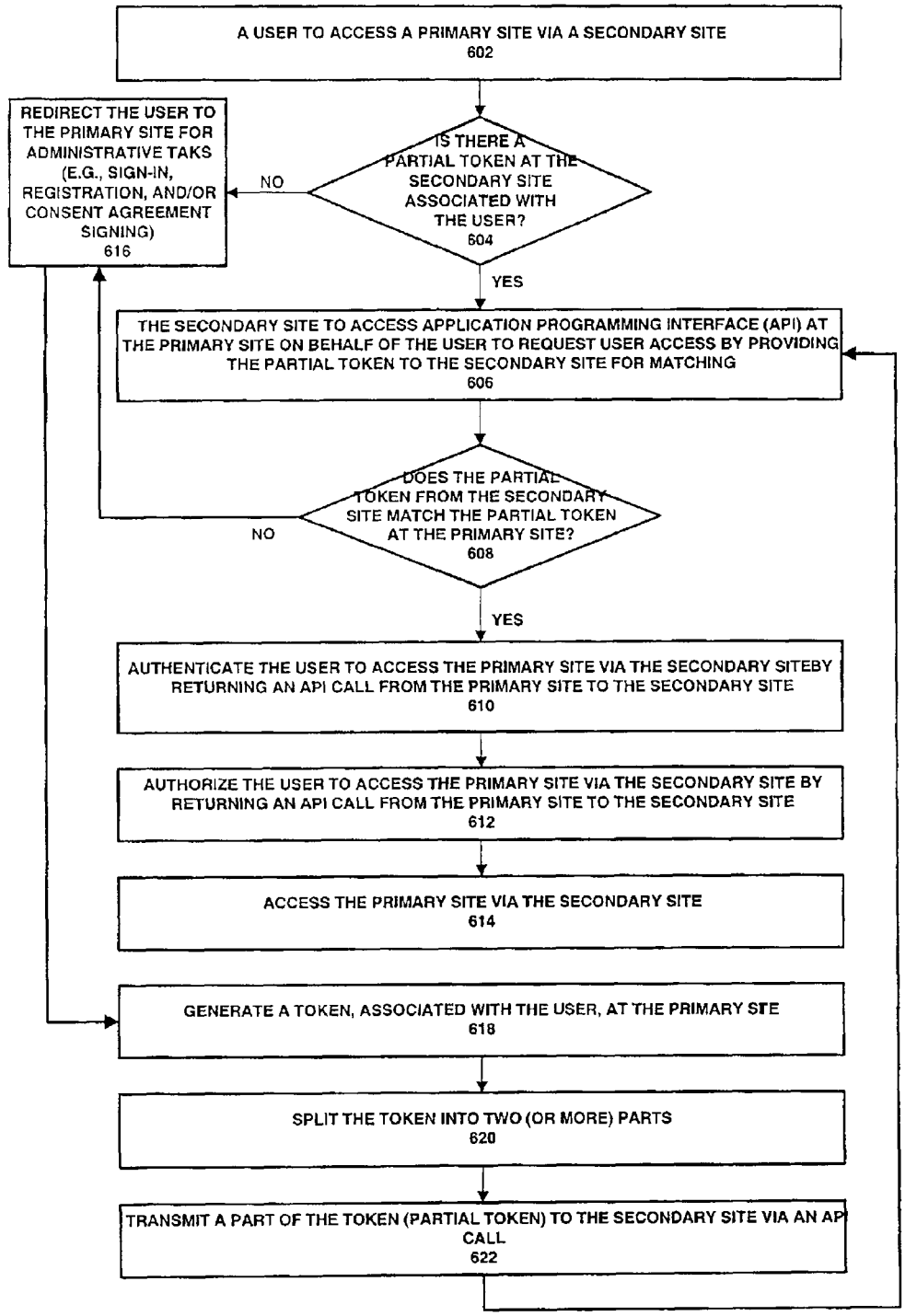
FIG. 6 is a flow diagram illustrating an embodiment of a process for providing user access to a primary site via a secondary site.

FIG. 6 is a flow diagram illustrating an embodiment of a process for providing user access to a primary site via a secondary site. At processing block 602, a user accesses a secondary site (e.g., MSN) in order to access a primary site (e.g., eBay). At decision block 604, at the secondary site, a determination is made as to whether there is a token (e.g., partial token) associated with the user at the secondary site. If not, the user is directed or redirected to the primary site to perform the sign-in flow, including signing-in and/or registration, and signing a consent agreement at processing block 616. If there exists a partial token, the secondary site contacts the primary site (e.g., access the API) on behalf of the user at processing block 606. The secondary site places a request for access with the primary site on behalf of the user and in doing so, provides the partial token to the primary site for matching it with the other part of the token stored at the primary site.

At decision block 608, a determination is made as to whether the partial token received from the secondary site matches with the partial token residing at the primary site. If the partial tokens do not match (e.g., the partial tokens together do not form a single token), the user is directed or redirected to the primary site to perform the sign-in flow at processing block 616. If the partial tokens are matched, the user is authenticated (e.g., user information and credentials are verified) to access the primary site at processing block 610. Once authenticated, the user is authorized (e.g., granted permission) to access the primary site via the secondary site at processing block 612. In one embodiment, the authentication and authorization may be performed simultaneously or in a particular order, such as authentication is performed prior to authorization, because there may not be a need to authorize the user if he or she is not authenticated. The user may then access the primary site via the secondary site at processing block 614.

Referring back to processing block 616, the user may sign-in, if already registered, or register and then sign-in. Following the registration, the user is provided an option to sign a consent agreement, which sets forth various primary and secondary sites rules and regulations, legal and administrative requirements, and useful recommendations. The user may choose not to agree to or sign the consent, in which case the user is redirected to the secondary site with an error message and is not permitted to access the primary site. If the user agrees to the consent agreement, a token is generated for the user by the primary site at processing block 618.

The entire token may then be provided to the secondary site for a single use, or the token is divided into portions to provide a partial token from the primary site to the secondary site at processing block 620. The partial token are used for future user access authentication and authorization purposes, so that the user does not have to perform various administrative tasks each time the user wishes to access the primary site. Furthermore, by matching the partial tokens, the authentication and authorization is performed with relative ease and security (e.g., without the user information being repeatedly transmitted between various sites). A partial token associated with the user is transmitted from the primary site to the secondary site via an API call at processing block 622. The process then continues at processing block 606. It is contemplated that a user may access the primary site via any number of secondary sites, in which case, a separate and distinct token may be generated for each of the secondary sites that the user wishes to access.

Figure 7:
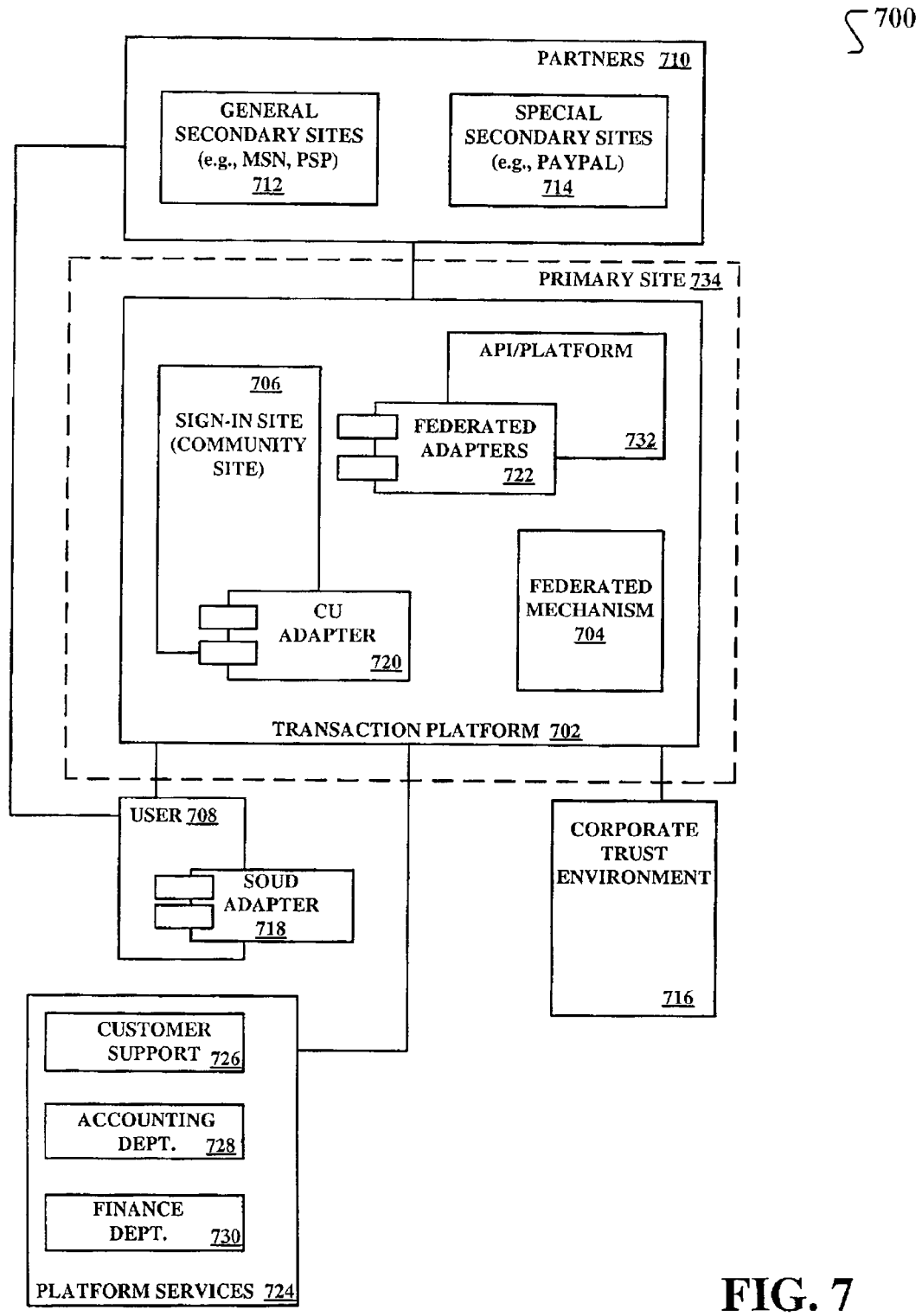
FIG. 7 is a flow diagram illustrating an embodiment of an authentication and authorization architecture having a transaction platform with a federated mechanism.

FIG. 7 is a flow diagram illustrating an embodiment of an authentication and authorization architecture 700 having a transaction platform 702 with a federated mechanism 704. In the illustrated embodiment, the transaction platform 702 is based at a primary site 734 (e.g., eBay). The transaction platform 702 includes a registration and sign-in site (e.g., eBay Community site) 706 for the user 708 to use when registering or signing-in, an API/platform 732 to provide an interface to have the user 708 access the primary site 734 via one or more partner secondary sites 710. The federated mechanism 704 is to provide a mechanism for authentication and authorization of users 708 by the primary site 734 and for authorization of the partners 710 by the users 708. The partners 710 include applications, tools, Websites, systems, and networks of various partners, such as general secondary sites 712 (e.g., preferred service partners (PSP), offeBay auction partners, and third party secondary sites (e.g., MSN, AOL, etc.)), and special secondary sites 714 (e.g., PayPal) having a particular relationship with the primary site 734.

The transaction platform 702 is further in communication with the corporate trust environment (e.g., organization) 716 that includes employees (e.g., information technology (IT) employees, company representatives) of the primary site 734 to access the user-related data for security purposes, to make company-related decisions with regard to the users 708, and to facilitate relationship and cooperation between the primary site 734, the partners 710, and the users 708. The corporate trust environment 716 may be managed using an organizational structure based on various industry standards (e.g., X.500 standard). Such standards may include a common set of attributes and referential constraints to manage the employees within a hierarchical structure, while the same structure can be used to construct access control levels of objects, also known as assets, in the organizational structure at the transaction platform 702.

Various adapters 718-722 (e.g., SiteOrgUserDefnAdapter, CompanyUserAdapter, and FederatedAdapter) may be used to perform certain tasks. For example, the site organization user definition (SOUD) adapter (e.g., SiteOrgUserDefn-Adapter) 718, which may be part of the primary site 734 transaction platform, is used to provide certain user-related information (e.g., the user's geographic location from where the access was attempted) to further help define the user 708 and to distinguish the user 708 from other entities and individuals, such as the primary site 734 employees in the corporate trust environment 716. The company user (CU) adapter (e.g., CompanyUserAdapter) 720 is associated with the sign-in site 706 and may be used to build or generate the token after the user 708 has successfully registered and signed-in. Once generated, the token is sent to the user-accessed partner secondary site 710 at the time the user 708 is redirected to the secondary site 710, or at a later stage, when the secondary site 710 requests the token. The secondary site 712-714 then transmits the token back to the primary site 734 each time the user 708 attempts to access the primary site 734 via the secondary site 710. Using the federated mechanism 704, the token is then decoded using a federated adapter (e.g., FederatedAdapter) 722 that is in communication with the sign-in site 706 and the API/platform 732.

The architecture 700 further includes platform services 724, such as customer support 726, accounting department 728, and finance department 730, in communication with the transaction platform 702 to perform various tasks, including security, accounting, and customer service-related transactions. Using the federated mechanism 704, a service-based access control is provided to these platform services 724 to access user information, as necessitated or desired, to perform various service-related operations.

The federated mechanism 704 allows the use of tokens to authenticate and authorize the user 708, without having the need to transmit user identification, user password, and other sensitive user information between various entities and systems. The tokens help provide added availability, reliability, scalability, security, and monitoring capabilities to the authentication and authorization system and architecture 700. The token (e.g., XML-based document) may be divided into one or more portions or segments, so that an encrypted portion of the token is transmitted to the partners 710. The token is configured such that it provides the secondary sites 712-714 enough information about the user 708 to recognized the user 708 as being authenticated and authorized to access the transaction platform 702 of the primary site 734. When the user 706 attempts to access the primary site 734 via a secondary site 712-714, the portion of the token is sent back to the transaction platform 702 of the primary site 734, where the partial token is decoded by the federated adapter 722 and matched with the other portion of the token at the transaction platform 702. If the match is successful, the user 708 is allowed to access the primary site 734 via the API/platform 732. In another embodiment, the entire token is sent to the partners 710, for example, when using the token for a single use. The data contained within the token may be controlled by the transaction platform privacy and security policy, and the data may be controlled on a use case basis and may first be approved through the channels supporting privacy and security policies. It is contemplated that the data may also be controlled by additional and other privacy and security policies.

Accessing the transaction platform 702 of the primary site 734 allows the user 708 to access a preferences site (e.g., My Transaction Platform) to set preferences as the user 708 prefers. The preferences include providing the user 708 an access control to authorize to give or deny or to increase or decrease the authority of the secondary site 712-714 to perform or act on behalf of the user 708.

Figure 8:
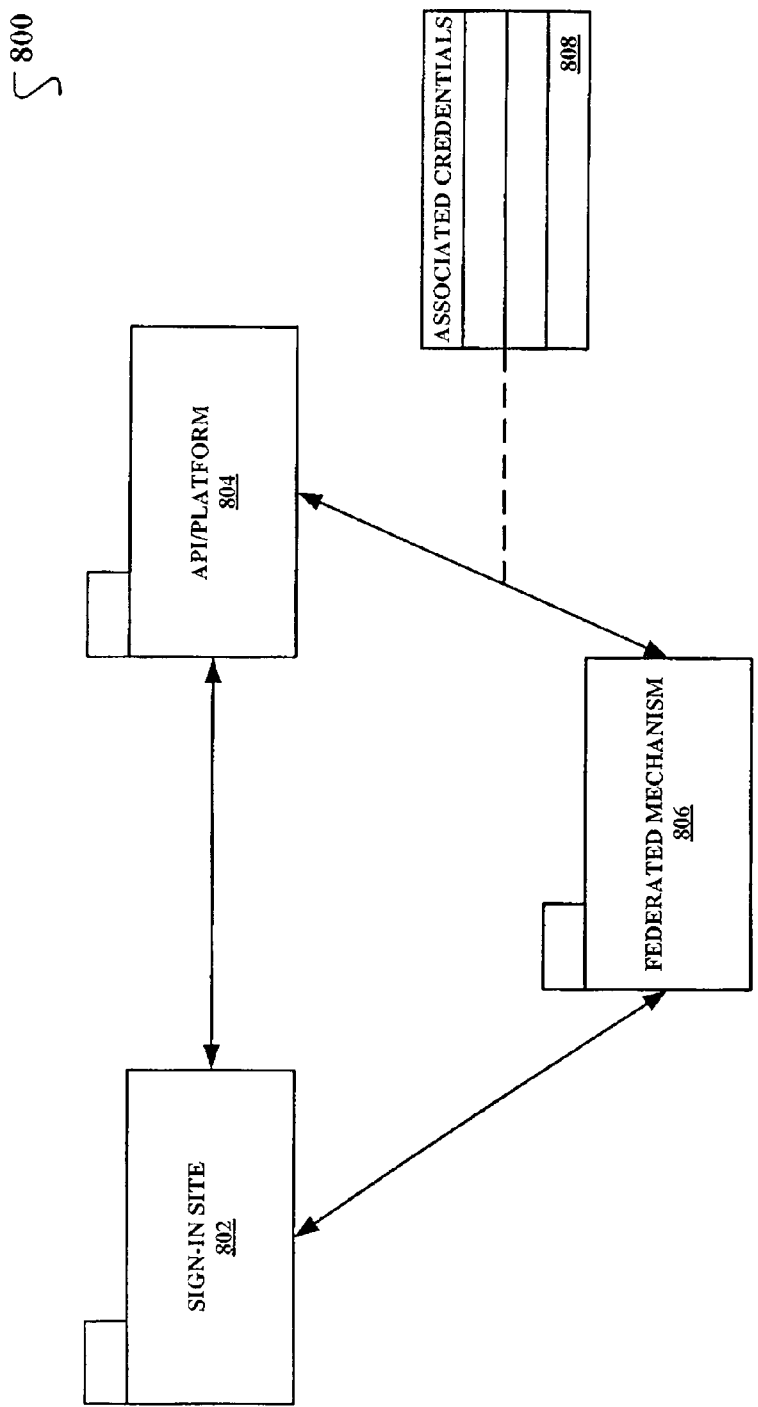
FIG. 8 is a block diagram illustrating an embodiment of a federated model.

FIG. 8 is a block diagram illustrating an embodiment of a federated model 800. In the illustrated embodiment, the federated model 800 is used to authenticate and authorize user access to the primary site via secondary sites. The federated model 800 includes a federated mechanism (e.g., system or subsystem) 806 in communication with the primary site's community site (e.g., www.website.com), which also functions as the sign-in site 802, for the user to sign-in and/or register to start the process of authentication and authorization. Both the federated mechanism 806 and the sign-in site 802 are based on the transaction platform of the primary site, which includes an API/platform 804. The federated mechanism 806 serves as an authenticator that is configured to recognize many other authentication mechanisms as compatible mechanisms or subsystems. The associated credentials 808 include user information (e.g., user identification, password, preferences, name, address, billing information, etc.) that the federated mechanism 806 uses, in communication with the API/platform 804 (regarded as client or source) and the community site including the sign-in site 802 (regarded as sink), to authenticate and authorize the user and user accesses.

The federation model 800 is configured such that it provides not only proper authentication and authorization for the user, but also serves as a secure access control for other components and entities associated with the transaction platform of the primary site. For example, the APIs of the federated model 800 provide XML tags using the Security Assertion Markup Language (SAML) standard in authentication and authorization responses to assert additional security for the data contained in the tokens. Moreover, the APIs provide monitoring interfaces working with security modules to allow the federated mechanism 806 and the transaction platform at the primary site to securely monitor various components and entities and securely validate the transmission of user data between such components and entities.

The federated mechanism 806 is configured for both authentication (e.g., user name/password, certificates, and secureID) and authorization (e.g., user access permission) to access the resources situated at the transaction platform of the primary site. The federated mechanism 806 is also configured to allow the user to authorize one or more of the secondary sites that the user access to access the primary site. Such authorization may be achieved by having the user insert particular preferences at the preferences site or page at the primary site. The user-granted authorization of the secondary site includes allowing the secondary site to act on behalf of the user in the user's presence and/or absence. For example, once authorized, the secondary site may place bids, introduce items for sale, etc., on the user's behalf. Furthermore, the federated mechanism 806 can be used as a delegator so that any number of entities in the federated model 800 can be responsible for managing their own part of the federated authentication space. For example, eWatch, a secondary site, may be delegated the responsibility to manage the customer support node of the transaction platform space and PayPal, another secondary site, can be delegated the responsibility to manage the global payments node of the transaction platform space.

The federated model 800 is managed using any one of the server products available in the market (e.g., Sun One Identity Server), while the federated mechanism 806 may use certain standards and services (e.g., Liberty Alliance, Identity Server) to facilitate the performance of various tasks, such as integration of a trust relationship to integrate multiple authentication mechanisms within the federated authentication domain. In conjunction with the domain are providers with whom the federated mechanism 806 may communicate to validate the authentication tokens. Also, integration of the components and entities of the federated model 800 may be used for providing interactions between member, customer, and user support features and site applications. Such integration may be provided using the interfaces that exist in C/C++ and Java, while supporting certificates, SecurID Fobs, and SAML.

Figure 9:
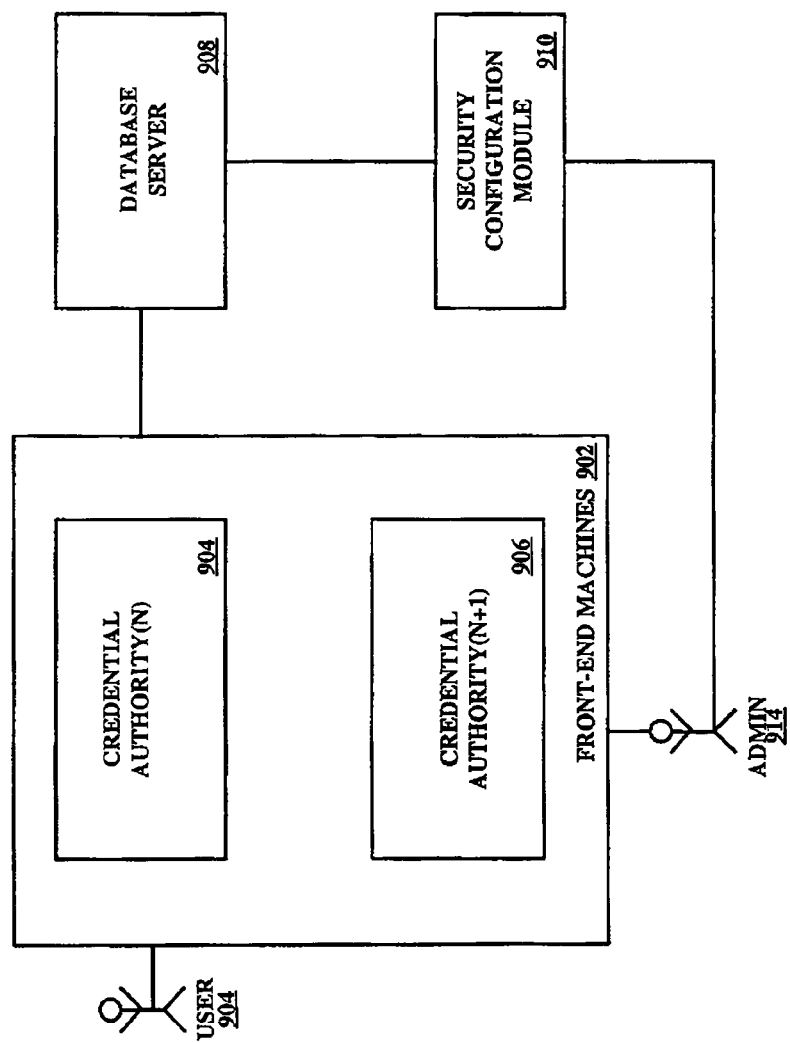
FIG. 9 is a block diagram illustrating an embodiment of a credential authority system based on a federated mechanism.

FIG. 9 is a block diagram illustrating an embodiment of a credential authority (CA) system 900 based on a federated mechanism. The CA system 900 is used to perform various authentication and authorization tasks within a federated mechanism, such as the federated mechanism of FIGS. 7 and 8. In one embodiment, the CA system 900 is to generate tokens at a transaction platform of a primary site to provide, for example, security in user access of the primary site via one or more secondary sites. The primary site (e.g., website.com), as discussed elsewhere in the disclosure, includes applications, system, Websites, tools, etc. The secondary site (e.g., MSN.com, AOL.com, eWatch.com, Points.com) includes applications, systems, Websites, and tools that the user 912 uses to access the primary site.

The CA system 900 includes front-end machines 902 (e.g., machine CA [n] 904, and machine CA [n+1] 906) for performing certain authentication and authorization functions in communication with a database server 908 and a security configuration module 910. The database server 908 may be used to store information necessary to authenticate and authorize a user 912. In addition to the user 912, a security administrator (e.g., an employee of the primary system) 914 may also access the front-end machines 902 and the security configuration module 910 to verify, certify, and/or configure user information, as necessitated or desired. Some of the authentication and authorization tasks may be delegated to an outside agent or administrator to perform.

To generate and design tokens and to make the overall system secure, the CA system 900 may use various cryptographic techniques to encrypt the tokens. To accomplish this, a key is used that may include a symmetric key (e.g. not a public/private key pair) and is not shared outside of the CA system 900. Because this key is sensitive and all measures may be used in order to protect the key from being compromised, the CA system 900 can include a separate pool of machines that exist on a protected network. The CA system 900 may also serve as a code-signing machine, where a private key digitally signs the code and the key is physically protected from compromise.

The CA system 900 is used to process events (e.g., requests), where not all requests include authentication checks. For example, some requests are simply communication requests from one site for another or Web requests to directly access the primary site (e.g., www.website.com) to perform certain tasks (e.g., browse the Website), in which case a cookie may be created instead of a token (also referred to as minted authenticator or minted cookie). To provide maximum security, the CA system 900 may use various hardware accelerators and security systems for performing ciphering and cryptography, including the Rivest-Shamir-Adleman (RSA) security and cryptography by RSA Security, Inc. located at Bedford, Mass. and El Gamal Algorithm by Taher El Gamal. The RSA implementation is also to implement RSA BSAFE implementation, which is a form of hardware accelerator, to support the BSAFE library interface. Alternative solutions include operating system platforms (e.g., OpenBSD) that are securely built into an operating system. The operating system platforms can dedicate a processor in a multiple-way hardware platform and are also configured to use one or more processors in a multi-processor system for cryptographic operations. The CA system 900 may further use decryption and encryption in validating a token's sequence number to prevent other systems or sites from replaying or minting the token authenticator.

The CA system 900 is relatively flexible as it is used and available for any number of types of operations that it controls. For example, for general browsing of the primary site, the CA system 900 may not be used or may be used to create a common cookie, as authentication is typically not required for users 912 in this mode, while for users 912 who seek authentication and/or administrative features, the CA system 900 is available to perform authentication and such other features. To achieve such flexibility, the CA system 900 uses multiple front-end machines 902, where one front-end machine 904 can drain its state to another active front-end machine 906. Similarly, the front-end machines 904-906 can cover each other in case of one of them crashing or is brought down for administrative purposes.

The CA system 900 is not only used to mint (e.g., manufacture, generate, and create) user authentication tokens, but also to help encrypt the user data and information for the authenticator. The content of the token may include a series of characters and/or a sequence of numbers, which corresponds to the user information provided, and is used to verify that the user 912 is who he says he is (e.g., he is not a hacker attempting to hack the system) and that the client (e.g., primary site) using the authenticator is related to and recognizes the user 912. Also, to provide maximum security of the data and the tokens, certain modules may be used with the CA system 900 to ensure protection of the encryption/decryption keys, rotation of the CA system front-end keys, and physical isolation of the front-end servers on a protected network.

For manageability and maintenance, the CA system's front-end environment contains methods that allow administrators 914 to perform administrative actions. Additionally, the CA system 900 is designed to provide automatic rotation, creation, and maintenance of the keys and subsequent tokens, without requiring additional maintenance overhead. Furthermore, the CA system 900 is extensible by using the security framework environment written in Java to easily write and deploy a new authenticator management. The CA system 900 by using various components (e.g. the Java security framework) is highly reusable.

Figure 10:
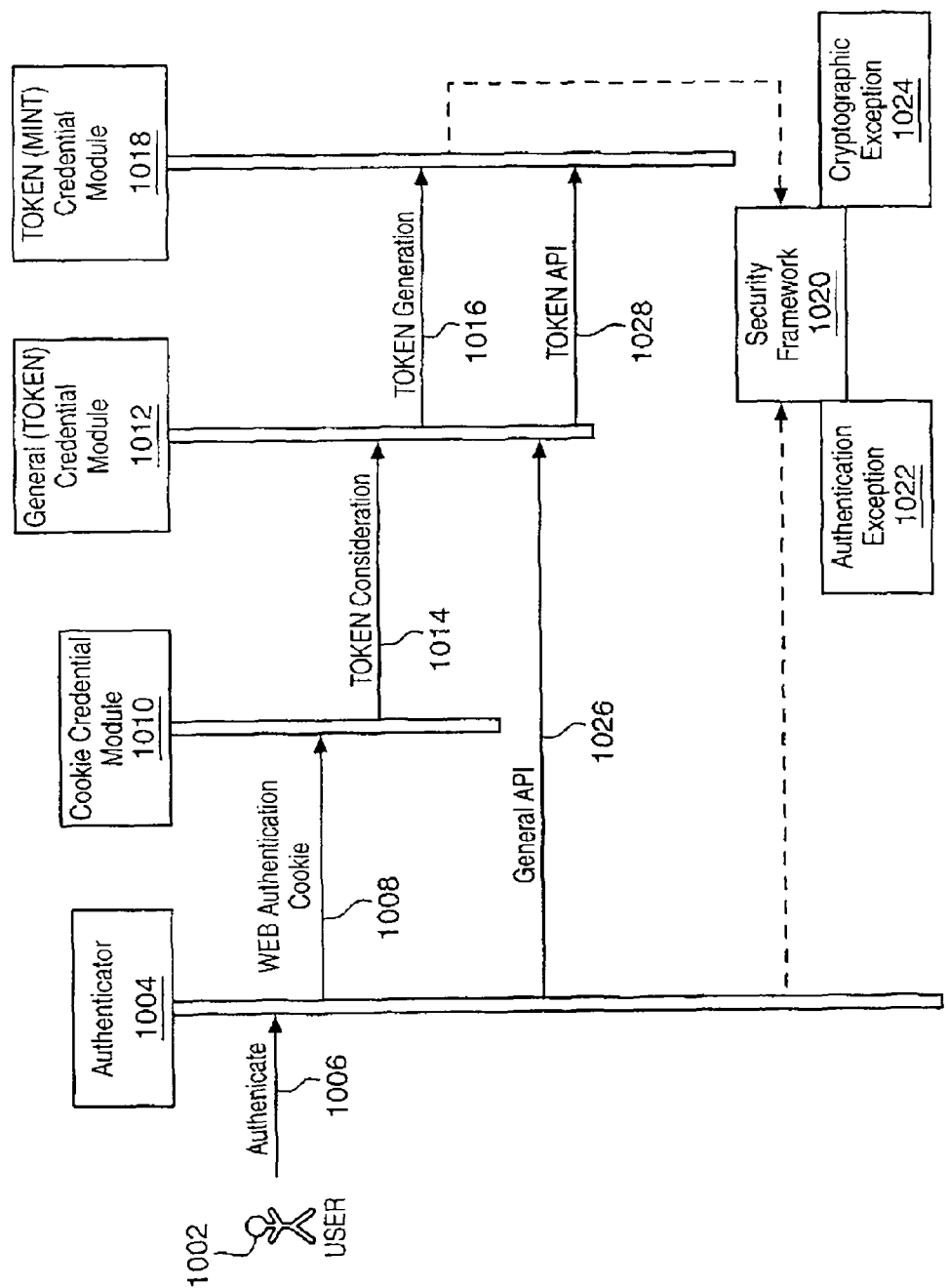
FIG. 10 is a transaction sequence diagram illustrating an embodiment of a sequence for determining whether to generate a common cookie or a token.

FIG. 10 is a transaction sequence diagram illustrating an embodiment of a sequence for determining whether to generate a common cookie or a token. In the illustrated embodiment, a user 1002 accesses the primary site for authentication 1006 via the authenticator 1004. The authenticator 1004 is part of the CA system that is based on a federated mechanism. The authenticator determines whether the user 1002 is a casual visitor to the primary site (e.g., to browse the primary site) or is someone attempting to access the primary site via a secondary site. If the user 1002 is determined to be a casual visitor, the user directed to the cookie credential module 1010 of the system for creating a Web authentication cookie 1008 for the user 1002.

However, if the user 1002 requires a token, the user 1002 is set to the general credential module 1012 of the system for authenticator token consideration 1014. The user is then directed to the mint credential or token credential module 1018 for token generation 1016. The user 1002 credential are then verified by verifying the user information with the security framework 1020 provided within the system. In case of an authentication failure, an authentication exception or error 1022 is provided. Similarly, in case of a cryptographical failure, a cryptographic exception or error 1024 is provided. The general API 1026 is provided for token consideration 1014, and the mint token API is provided 1028 for token generation 1016 by the authenticator 1004 at the system.

Figure 11:
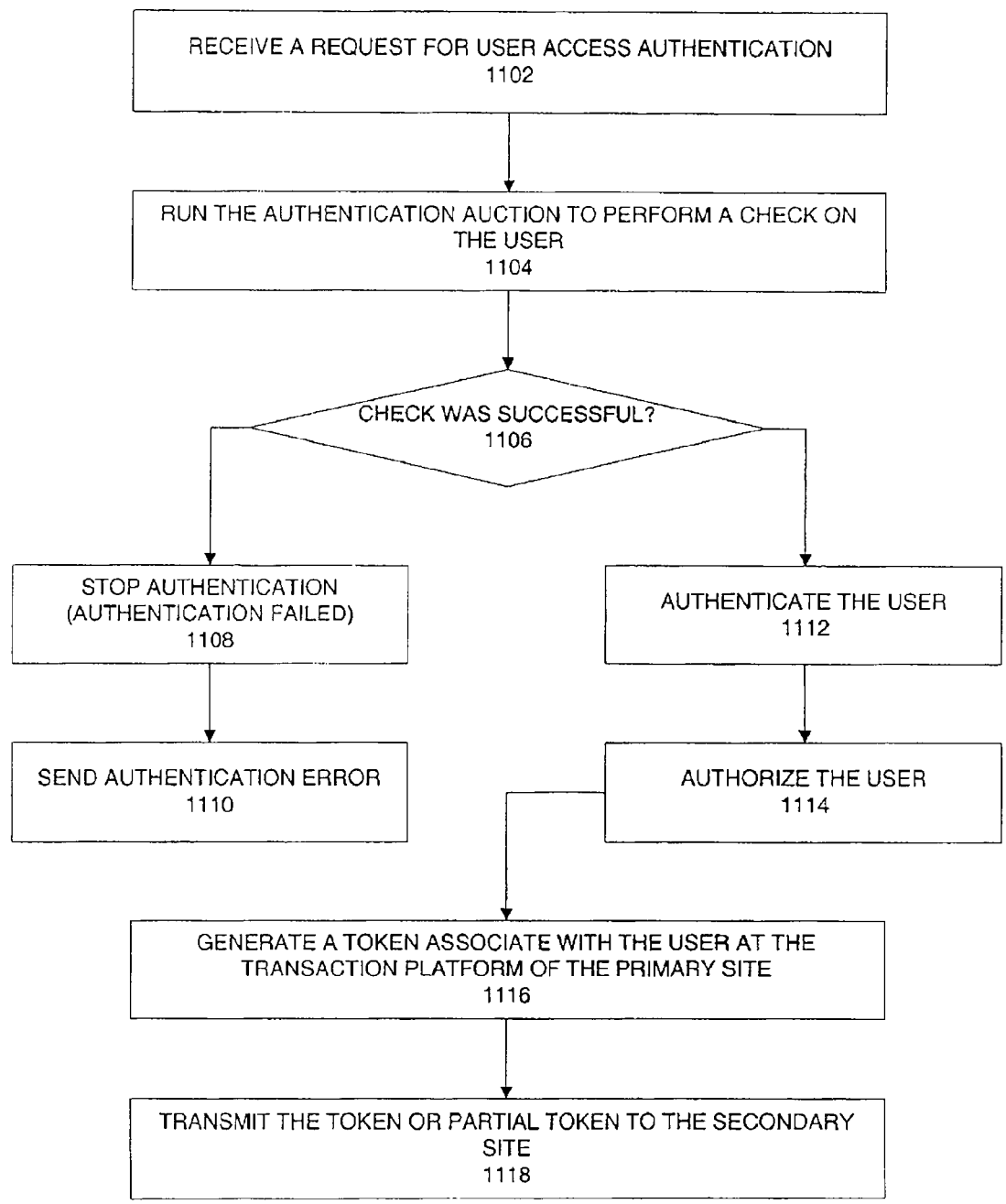
FIG. 11 is flow diagram illustrating an embodiment of a process for generating a token.

FIG. 11 is flow diagram illustrating an embodiment of a process for generating a token. First, a request for authenticating a user for user access is received at an authentication system (e.g., federated mechanism-based credential authority system) at the transaction platform of a primary system at processing block 1102. In response to the request, an authentication action or check is run which includes verifying the user information and checking the credibility and credentials of the user along with other factors at processing block 1104. At decision block 1106, a determination is made as to whether the check was successful. Stated differently, whether the criteria for authenticating a user has been met. If not, the authentication process stops (e.g., authentication of the user fails) at processing block 1108. With the failure of the authentication, the user is not authenticated and an authentication error is sent to the secondary site indicating the authentication failure at processing block 1110. An error indicating the authentication failure may also be sent to the user by the secondary system.

Referring back to the decision block 1106, if the check is successful, the user is authenticated at processing block 1112. Once the user is authenticated, the user is then authorized to access the primary site via a secondary site at processing block 1114. A token is then generated corresponding to the user at processing block 1116. The token containing relevant data is generated using an authentication and authorization system at the transaction platform of the primary site. The token is then transmitted to the secondary site at processing block 1118. For a single use, the entire token may be sent to the secondary site. For multiple or future uses, the token may first be divided into two or more portions and a partial token is sent to the secondary site. The remaining portion of the token is kept at the primary site.

Figure 12A:
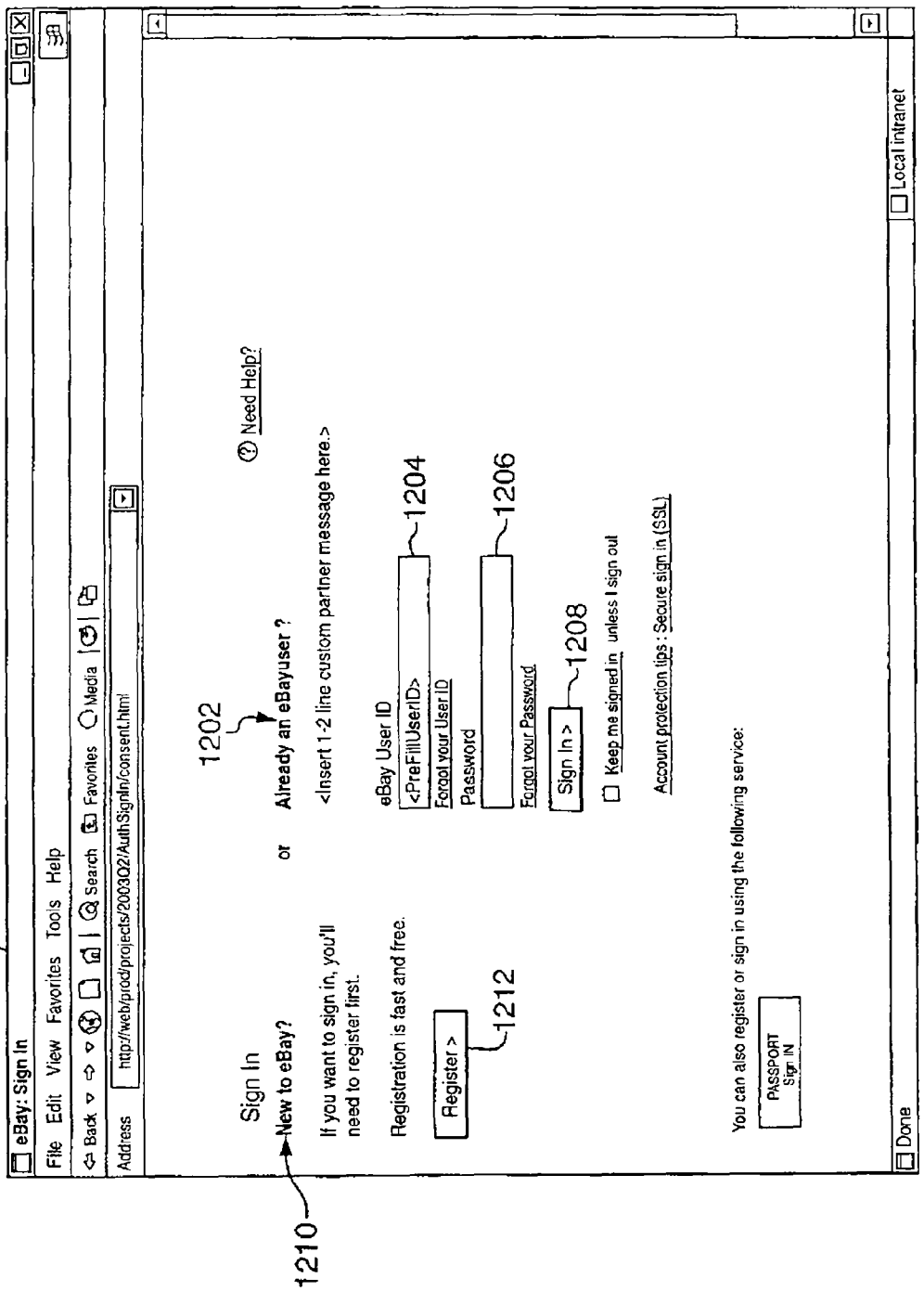
FIG. 12A is an exemplary illustration of a primary site sign-in page.

FIG. 12A is an exemplary illustration of a primary site sign-in page 1200. In the illustrated embodiment, the sign-in page 1200 provides the user with the option of signing-in 1202 if the user is already a member of the primary site (e.g., eBay). The user may do that by entering a user ID 1204 and a password 1206 and by clicking on Sign-In 1208. If the user is not a member and is new 1210 to the primary site, the user may need to first register with the primary site by clicking Register 1212 to carry the user to the next page for registration.

Figure 12B:
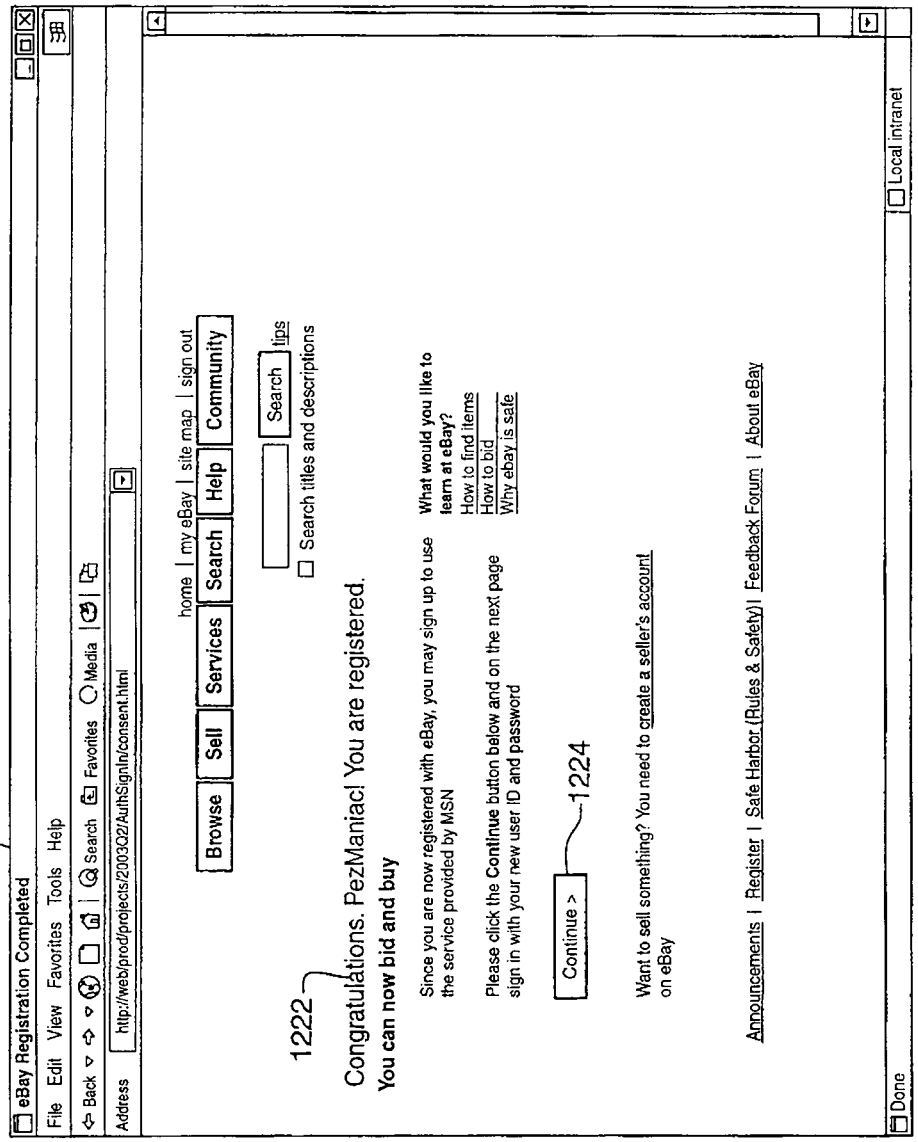
FIG. 12B is an exemplary illustration of a primary site registration completion page.

FIG. 12B is an exemplary illustration of a primary site registration completion page 1220. The registration completion page 1220 is shown after the user has completed registration to the primary site. As illustrated, the registration completion page 1220 illustrates a message 1222 to the user indicating the successful completion of user registration (e.g., congratulating the user on the successful registration). The user may then click Continue 1224 to proceed with using the primary site.

Figure 12C:
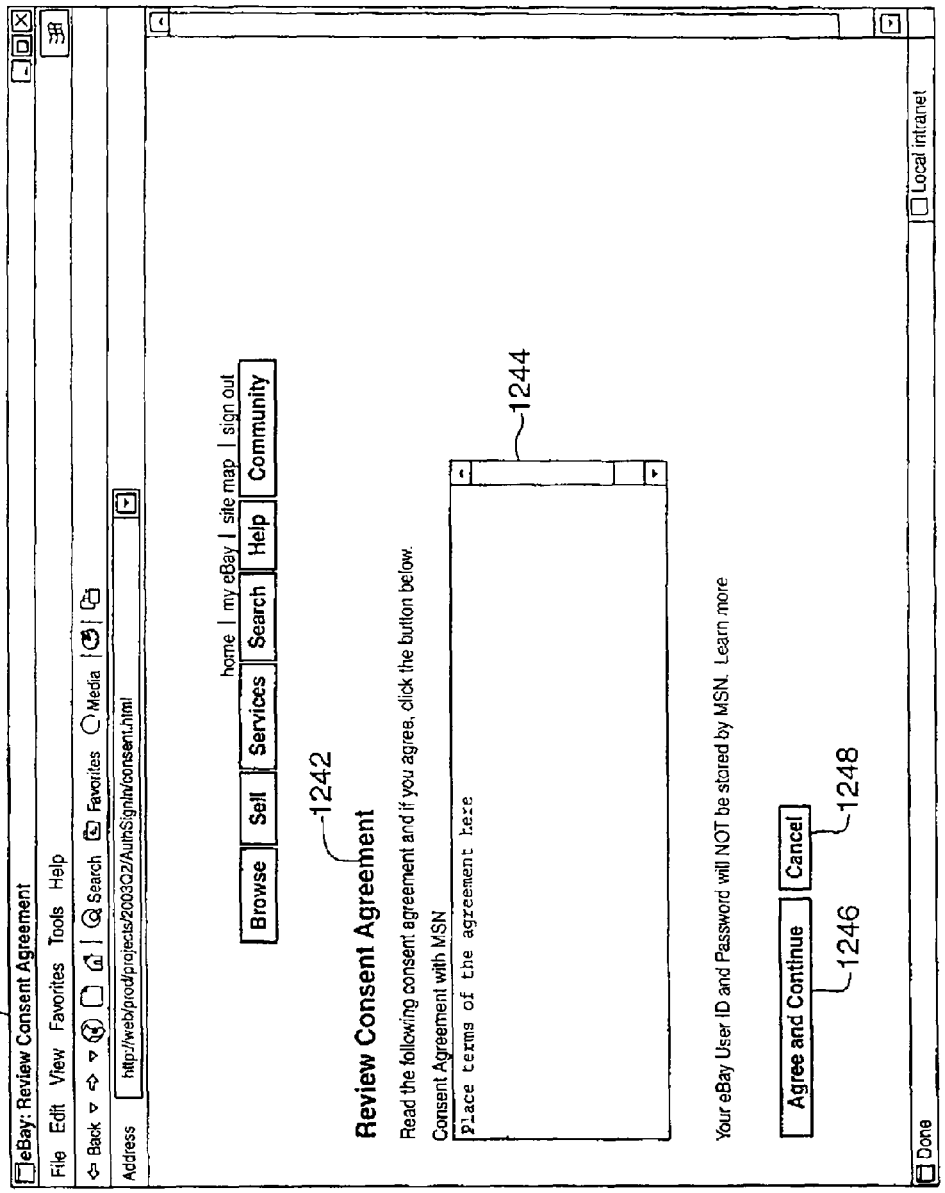
FIG. 12C is an exemplary illustration of a primary site consent agreement page.

FIG. 12C is an exemplary illustration of a primary site consent agreement page 1240. The consent agreement page 1240 provides a review 1242 of the consent agreement for the user. The user may choose to read the consent agreement that is provided in a window 1244 for the user's review. If the user agrees with the agreement and wants to proceed with accessing the primary site, the user may choose to click Agree and Continue 1246. If the user disagrees with the agreement or chooses not to proceed, the user may choose to click Cancel 1248.

Figure 12D:
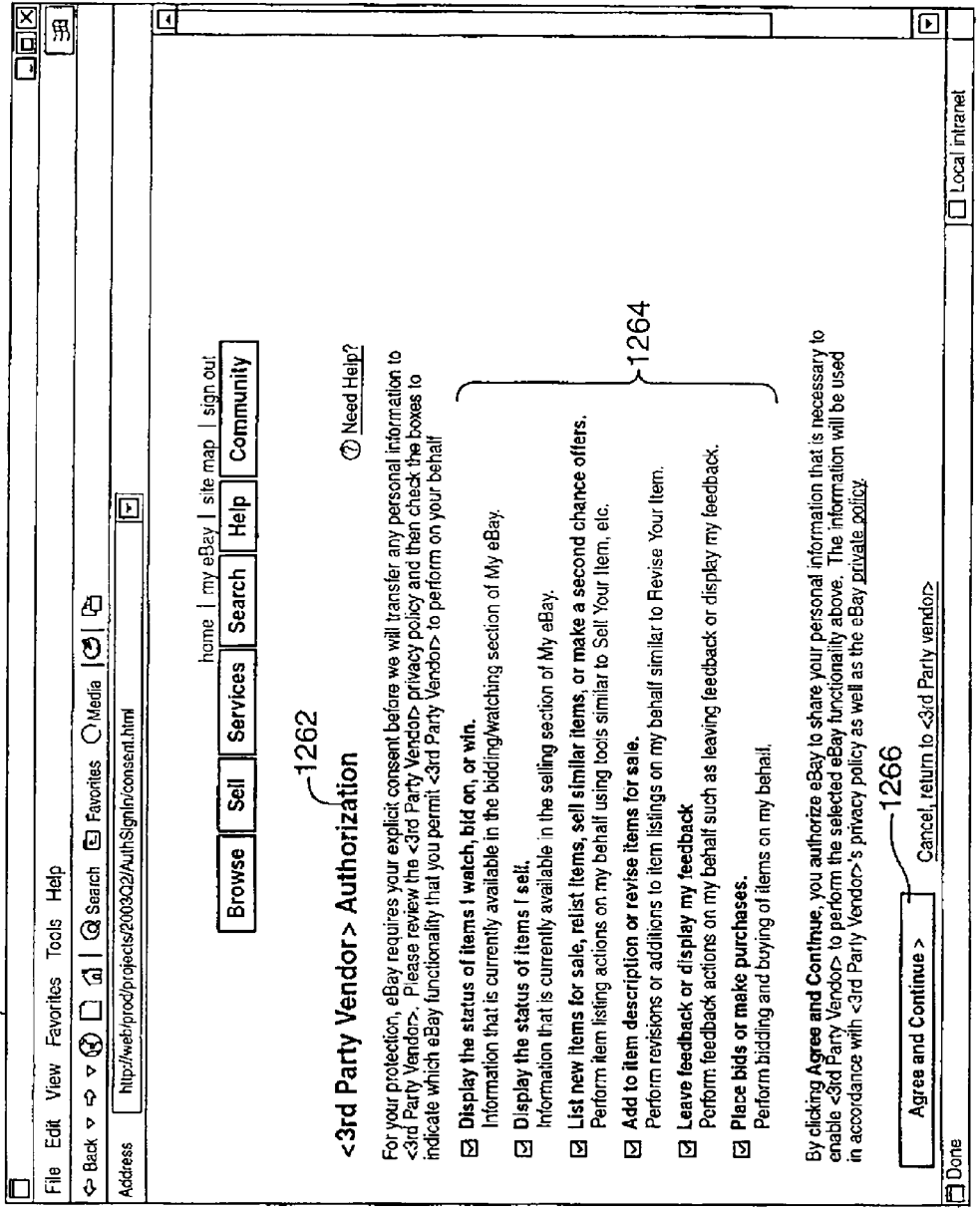
FIG. 12D is an exemplary illustration of a primary site authorization page for secondary sites.

FIG. 12D is an exemplary illustration of a primary site authorization page for secondary sites 1260. The authorization page 1260 is one way for users to provide a certain level of authorization to secondary sites to act on their behalf when accessing the primary site. The authorization page 1260 provides a list of options and functionalities 1264 that the user may chose to authorize the secondary site to perform. After choosing the functionalities, the user may click Agree and Continue 1266 to continue. The list 1264 is provided under the heading <3rd Party Vendor> Authorization 1262. The term "3rd Party Vendor" refers to and is synonymous with the term secondary site.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method to authenticate a user using a secondary site to access a primary site, the method comprising:
    receiving, via the secondary site, a request for authentication of the user, the request for authentication of the user including user information corresponding to the user;
    verifying the user information and generating at the primary site a token associated with the user;
    based on the verifying, generating, using a processor, a first partial token comprising a first segment or portion of the token associated with the user, the first partial token to be transmitted to and stored at the secondary site; and
    generating a second partial token comprising a second segment or portion of the token to be stored at the primary site without transmission of the second partial token to the secondary site, the second partial token to be stored at the primary site matching the first partial token to be stored at the secondary site to form the token, wherein the first partial token is to be stored at the secondary site without the second partial token, the first partial token to be used to enable the secondary site to perform a task on the primary site on behalf of the user.

2. The method of claim 1, wherein the task comprises allowing access to data on the primary site associated with the user.

3. The method of claim 1, further comprising:
    receiving a request from the secondary site to perform the task on behalf of the user, the request to perform the task comprising the first partial token;
    verifying the first partial token; and
    based on the verification of the first partial token, performing the task.

4. The method of claim 1, further comprising receiving an indication of user consent to enable the secondary site to perform the task on the primary site on behalf of the user.

5. The method of claim 1, wherein the receiving of the request for authentication of the user via a secondary site comprises receiving a redirection of the user from the secondary site.

6. The method of claim 1, wherein the user information comprises sign-in information.

7. The method of claim 1, further comprising transmitting the user information associated with the user to the secondary site.

8. A system comprising:
a security configuration module including one or more processors
to receive, via a secondary site, a request for authentication of a user using the secondary site to access a primary site, the request for authentication of the user including user information corresponding to the user, and
to verify, the user information and generate at the primary site a token associated with the user; and
a credential authority including one or more processors
to generate, based on the verifying, a first partial token comprising a first segment or portion of the token associated with the user, the first partial token to be transmitted to and stored at the secondary site,
wherein the credential authority is further to generate a second partial token comprising a second segment or portion of the token to be stored at the primary site without transmission of the second partial token to the secondary site, the second partial token to be stored at the primary site matching the first partial token to be stored at the secondary site to form the token,
wherein the first partial token is to be stored at the secondary site without the second partial token, the first partial token to be used to enable the secondary site to perform a task on the primary site on behalf of the user.

9. The system of claim 8, wherein the task comprises allowing access to data on the primary site associated with the user.

10. The system of claim 8, wherein the security configuration module is further to receive a request to perform the task on behalf of the user, the request to perform the task comprising the first partial token and to verify the first partial token, and based on the verification, to perform the task.

11. The system of claim 8, wherein the credential authority is further to receive an indication of user consent to enable the secondary site to perform the task on the primary site on behalf of the user.

12. The system of claim 8, wherein the receiving of the request for authentication of the user via a secondary site comprises receiving a redirection of the user from the secondary site.

13. The system of claim 8, wherein the user information comprises sign-in information.

14. The system of claim 8, wherein credential authority is further to transmit user information associated with the user to the secondary site.

15. A non-transitory machine-readable medium having stored thereon instructions which, when executed by a machine, cause the machine to perform operations comprising:
receiving, via a secondary site, a request for authentication of a user using the secondary site to access a primary site, the request for authentication of the user including user information corresponding to the user;
verifying the user information and generating at the primary site a token associated with the user;
based on the verifying, generating, using a processor, a first partial token comprising a first segment or portion of the token associated with the user, the first partial token to be transmitted to and stored at the secondary site; and
generating a second partial token comprising a second segment or portion of the token to be stored at the primary site without transmission of the second partial token to the secondary site, the second partial token to be stored at the primary site matching the first partial token to be stored at the secondary site to form the token, wherein the first partial token is to be stored at the secondary site without the second partial token, the first partial token to be used to enable the secondary site to perform a task on the primary site on behalf of the user.

16. The machine-readable medium of claim 15, wherein the instructions further cause the machine to perform operations comprising:
receiving a request to perform the task on behalf of the user, the request to perform the task comprising the first partial token; and
verifying the first partial token; and
based on the verification of the first partial token, performing the task.

17. The machine-readable medium of claim 15, wherein the instructions further cause the machine to perform operations comprising receiving an indication of user consent to enable the secondary site to perform the task on the primary site on behalf of the user.

18. The machine-readable medium of claim 15, wherein the instructions further cause the machine to perform operations comprising transmitting information associated with the user to the secondary site.

* * * * *

UNITED STATES PATENT AND TRADEMARK OFFICE
CERTIFICATE OF CORRECTION

PATENT NO. : 8,478,989 B2  
APPLICATION NO. : 12/848840  
DATED : July 2, 2013  
INVENTOR(S) : Lynch et al.

Page 1 of 1

It is certified that error appears in the above-identified patent and that said Letters Patent is hereby corrected as shown below:

In the Claims

In column 21, line 15, in Claim 8, after "processors", insert --:--, therefor

In column 21, line 24, in Claim 8, after "processors", insert --:--, therefor

Signed and Sealed this  
Tenth Day of September, 2013

Teresa Stanek Rea  
*Acting Director of the United States Patent and Trademark Office*